US006970935B1

(12) United States Patent
Maes

(10) Patent No.: US 6,970,935 B1
(45) Date of Patent: Nov. 29, 2005

(54) CONVERSATIONAL NETWORKING VIA TRANSPORT, CODING AND CONTROL CONVERSATIONAL PROTOCOLS

(75) Inventor: Stephane H. Maes, Danbury, CT (US)

(73) Assignee: International Business Machines Corporation, Armonk, NY (US)

(*) Notice: Subject to any disclaimer, the term of this patent is extended or adjusted under 35 U.S.C. 154(b) by 730 days.

(21) Appl. No.: 09/703,574

(22) Filed: Nov. 1, 2000

(51) Int. Cl.[7] .............................................. G06F 15/16
(52) U.S. Cl. ...................... 709/230; 709/228; 370/356; 379/88.02
(58) Field of Search ................................ 709/230, 228; 370/261, 356, 349, 401; 379/88.02; 345/753; 713/164

(56) References Cited

U.S. PATENT DOCUMENTS

| | | | | |
|---|---|---|---|---|
| 5,918,020 A | * | 6/1999 | Blackard et al. ............ | 709/228 |
| 5,995,096 A | * | 11/1999 | Kitahara et al. ............ | 345/753 |
| 6,195,636 B1 | * | 2/2001 | Crupi et al. ................ | 704/231 |
| 6,233,235 B1 | * | 5/2001 | Burke et al. ................ | 370/356 |
| 6,289,085 B1 | * | 9/2001 | Miyashita et al. ....... | 379/88.02 |
| 6,289,382 B1 | * | 9/2001 | Bowman-Amuah ......... | 709/226 |
| 6,304,574 B1 | * | 10/2001 | Schoo et al. ................ | 370/401 |
| 6,574,213 B1 | * | 6/2003 | Anandakumar et al. .... | 370/349 |
| 6,580,695 B2 | * | 6/2003 | Kluck et al. ................ | 370/261 |
| 2002/0120760 A1 | * | 8/2002 | Kimchi et al. .............. | 709/230 |
| 2003/0177354 A1 | * | 9/2003 | Carter ........................ | 713/164 |

* cited by examiner

Primary Examiner—Wen-Tai Lin
(74) Attorney, Agent, or Firm—F.Chau & Associates, LLC; Frank V. DeRosa

(57) ABSTRACT

Conversational protocols for implementing distributed conversational networking architectures and/or distributed conversational applications, as well as real-time conversational computing between network-connected pervasive computing devices and/or servers over a computer network. In one aspect of the invention, a communication stack for use in a real-time distributed conversational network comprises a first layer for generating encoded audio data, a second layer for wrapping encoded audio data in a real-time encoded audio data stream, and a third layer for wrapping control messages in a real-time control data stream for real-time control of conversational distributed functions over the network. Preferably, the communication stack comprises extensions of RTP (Real Time Protocol) and RTCP (Real Time Control Protocol) to respectively transmit, in real-time, the necessary encoded audio data and control data for executing and controlling distributed conversational functions, wherein meta information associated with the real-time encoded audio stream is added as an extension of header of an RTP packet, and wherein meta information associated with the real-time control data stream is added as an extension of a header of an packet.

30 Claims, 18 Drawing Sheets

FIG. 4 – RecoVC File Header

| Field Name | M/O | Number of Bytes | Value(s) | Description |
|---|---|---|---|---|
| Recovc magic number | M | 4 bytes | 0x2E727663 | A fixed value which equals ".rvc" in ASCII representation. Used to verify that this is indeed a Recovc file. |
| Header length | M | 2 byte | 13-(2^16-1) | Total number of bytes in this header |
| Version Major | M | 1 byte | 0-255 | File format major version number |
| Version Minor | M | 1 byte | 0-255 | File format minor version number |
| Frame duration | M | 1 byte | 0x00 | Index into the frame duration table below. |
| Frames per block | M | 1 byte | 1-255 | Each block can contain one intra-frame only, or one intra-frame with up to 244 additional inter-frames. |
| Sampling rate | M | 1 byte | 0x00, 0x01 or 0x02 | Index into sampling rate table below. |
| Cepstra dimension | M | 1 byte | 0x00 or 0x01 | Index into Cepstra vector dimension / type below |
| Language | M | 1 byte | 0x00 | Index into language table below |
| Profile | M | 1 byte | 0x00 or 0x01 | Index into profile table below |
| Total frames | O | 4 bytes | 0-(2^32-2) or 0xFFFFFFFF | Total number of audio frames in this file, INCLUDING silence frames. |
| Total speech frames | O | 4 bytes | 0-(2^32-2) or 0xFFFFFFFF | Total number of audio frames in this file, EXCLUDING silence frames. |
| <Ancillary Data> | O | | | Reserved for future usage |

Frame Duration Table

| Code | Duration (msec) |
|---|---|
| 0x00 | 10 |
| 0x01-0xFF | Reserved |

Sampling Rate Table

| Code | Input Sampling Rate [Hz] |
|---|---|
| 0x00 | 8000 |
| 0x01 | 11025 (or 11000) |
| 0x02 | 16000 |
| 0x03 | 22050 (or 22000) |
| 0x04-0xFF | Reserved |

Cepstra Vector Dimension/type Table

| Code | Value |
|---|---|
| 0x00 | 13 |
| 0x01 | 24 |
| 0x02-0xFF | Reserved |

Language Table

| Code | Description |
|---|---|
| 0x00 | English |
| 0x01-0xFF | Reserved |

FIG. 5

*Profile Table*

| Code | Description |
|---|---|
| 0x00 | Recognition only-Only Cepstra is available in this file |
| 0x01 | Reconstruction enabled-Cepstra and pitch is available in the file |
| 0x02-0xFF | Reserved |

*Speech and Silence Segment Headers (5 Byte)*

| Field Name | M/O | Number of bytes | Value(s) | Description |
|---|---|---|---|---|
| Segment type | M | 1 byte | 0x00 or 0x01 | Index into segment type table below (speech or silence) |
| Number of frames | M | 4 bytes | 0-(2^31-2) or 0xFFFFFFFF | The total number of frames in this segment. |

*End of Stream and Data Segment Headers*

| Field Name | M/O | Number of bytes | Value(s) | Description |
|---|---|---|---|---|
| Segment type | M | 1 byte | 0x02 or 0x03-0xFF | Index into segment type table below (end of stream or data) |
| Segment length | M | 4 bytes | 5-(2^31-1) | The total number of bytes in this segment. |
| <Ancillary Data> | O | | | Place optional data here |

FIG. 6

Protocols structure:

CONVERSATIONAL NETWORKING VIA TRANSPORT, CODING AND CONTROL CONVERSATIONAL PROTOCOLS

BACKGROUND

1. Technical Field

The present application relates generally to systems and method for providing conversational networking and, more particularly, to conversational protocols for implementing distributed conversational applications over a computer network.

2. Description of Related Art

The computing world is evolving towards an era where billions of interconnected pervasive clients communicate with powerful information servers. Indeed, this millennium will be characterized by the availability of multiple information devices that make ubiquitous information access an accepted fact of life. The evolution of the computer world towards billions of pervasive devices interconnected via the Internet, wireless networks or spontaneous networks (such as Bluetooth and Jini) will revolutionize the principles underlying man-machine interaction. In the near future, personal information devices will offer ubiquitous access, bringing with them the ability to create, manipulate and exchange any information anywhere and anytime using interaction modalities (e.g., speech and/or GUI) most suited to the user's current needs and abilities. Such devices will include familiar access devices such as conventional telephones, cell phones, smart phones, pocket organizers, PDAs and PCs, which vary widely in the interface peripherals they use to communicate with the user.

The information being manipulated via such devices may reside on the local device or be accessed from a remote server via a communications network using open, interoperable protocols and standards. The implementation of such open standards also leads to a seamless integration across multiple networks and multiple information sources such as an individual's personal information, corporate information available on private networks, and public information accessible via the global Internet. The availability of a unified information source will define productivity applications and tools of the future. Indeed, users will increasingly interact with electronic information, as opposed to interacting with platform-specific software applications as is currently done in the world of the desktop PC.

With the pervasiveness of computing causing information appliances to merge into the users environment, the user's mental model of these devices is likely to undergo a dramatic shift. Today, users regard computing as an activity that is performed at a single device like the PC. As information appliances abound, user interaction with these multiple devices will be grounded on a different set of abstractions. The most intuitive and effective user model for such interaction will be based on what users are already familiar with in today's world of human-intermediated information interchange, where information transactions are modeled as a conversation amongst the various participants in the conversation.

Indeed, it is expected that information-centric computing carried out over a plethora of multi-modal information devices will be essentially conversational in nature and will foster an explosion of conversational devices and applications. It is to be noted that the term "conversational" is used to mean more than speech interaction—it encompasses all forms of information interchange, where such interchange is typically embodied by one participant posing a request that is fulfilled by one or more participants in the conversational interaction. The core principle behind the conversational interaction is that any interaction between the user and the machine be handled as a dialog similar to human—human dialog. Accordingly, the increasing availability of information available over a communications network, along with the rise in the computational power available to each user to manipulate this information, brings with it a concomitant need to increase the bandwidth of man-machine communication so that the increased human-machine interaction that will result from the pervasive use of such information devices will be as natural and simple as if the user was having a conversation with another individual.

With the increased deployment of conversational systems, however, new technical challenges and limitations must be addressed. For instance, currently available pervasive clients typically do not have the required memory and/or processing power to support complex conversational tasks such as recognition and presentation. Indeed, even with the rapid evolution of the embedded processor capabilities (low power or regular processors), one can not expect that all the processing power or memory is available for executing complex conversational tasks such as, for example, speech recognition (especially when the vocabulary size is large or specialized or when domain-specific/application-specific language models or grammars are needed), NLU (natural language understanding), NLG (natural language generation), TTS(text-to-speech synthesis), audio capture and compression/decompression, playback, dialog generation, dialog management, speaker recognition, topic recognition, and audio/multimedia indexing and searching, etc.

Moreover, even if a networked device is "powerful" enough (in terms of CPU and memory) to execute all these conversational tasks, the device may not have access to the appropriate domain-specific and application-specific data files or appropriate algorithms (e.g., engines) to adequately execute such tasks. Indeed, vendors and service providers typically do not allow for open exchange of the algorithms (conversational engines) for executing conversational tasks and/or the data files (conversational arguments) utilized by such algorithms (e.g., grammars, language models, vocabulary files, parsing, tags, voiceprints, TTS rules, etc.) to execute such tasks, which they consider intellectual, business logic and technology crown jewels. Indeed, some conversational functions may be too specific to a given service, thereby requiring back end information that is only available from other devices or machines on the network.

Furthermore, the network infrastructure may not provide adequate bandwidth for rapidly exchanging data files needed by conversational engines for executing conversational tasks. For example, NLU and NLG services on a client device typically require server-side assistance since the complete set of conversational arguments or functions needed to generate the dialog (e.g., parser, tagger, translator, etc.) may be too extensive (in terms of communication bandwidth) for transmission from the server to the client over the network connection. In addition, even if such data files can be transmitted over the network, such transmission may introduce long delays before the client device is able to commence an application or process an input, thereby preventing real-time interactions.

These problems may be solved through implementation of distributed architectures, assuming that such architectures are implemented in appropriately managed networks to guarantee quality of service for each active dialog. Indeed, the problems associated with a distributed architecture and distributed processing between client and servers require new methods for conversational networking. Such methods comprise management of traffic and resources distributed across the network to guarantee appropriate dialog flow of for each user engaged in a conversational interaction across the network.

Accordingly, systems and methods that provide conversational networking through implementation of, e.g., distributed speech recognition (DSR), distributed conversational architectures and conversational protocols for transport, coding and control, are highly desirable. Indeed, it would be advantageous to allow network devices with limited resources to perform complex conversational tasks (preferably in real-time) using networked resources in a manner which is automatic and transparent to the users of such devices.

SUMMARY OF THE INVENTION

The present invention is directed to conversational protocols for implementing distributed conversational networking architectures and/or distributed conversational applications, as well as real-time conversational computing between network-connected pervasive computing devices and/or servers over a computer network. The implementation of distributed conversational systems/applications according to the present invention is based, in part, on a suitably defined conversational coding, transport and control protocols.

In one aspect of the invention, a communication stack for use in a real-time distributed conversational network comprises a first layer for generating encoded audio data, a second layer for wrapping encoded audio data in a real-time encoded audio data stream, and a third layer for wrapping control messages in a real-time control data stream for real-time control of conversational distributed functions over the network.

Preferably, the communication stack comprises extensions of RTP (Real Time Protocol) and RTCP (Real Time Control Protocol) to respectively transmit, in real-time, the necessary encoded audio data and control data for executing and controlling distributed conversational functions. Meta information associated with the real-time encoded audio stream is added as an extension of a header of an RTP packet, wherein the RTP header extension comprises one field indicating an encoding type of the encoded audio data in the RTP packet and a second field comprising header information associated with a file of the encoded audio data. Further, meta information associated with the real-time control data stream is added as an extension of a header of an RTCP (Real Time Control Protocol) packet, wherein the RTCP header extension comprises a first field indicating a type of conversational distributed protocol and a second field comprising a corresponding control message. The control data may comprise any type of application-specific control data that may be utilized for implementing a specific distributed framework.

In another aspect, the communication stack comprises a fourth layer for generating a real-time transmission control data stream, wherein the real-time transmission control data stream comprises meta information for providing coding scheme notifications. Meta information associated with the real-time transmission control data stream is preferably added as an extension of a header of an RTCP (Real Time Control Protocol) packet.

These and other aspects, features and advantages of the present invention will be described and become apparent from the following detailed description of preferred embodiments, which is to be read in connection with the accompanying drawings.

BRIEF DESCRIPTION OF THE DRAWINGS

FIG. 4 is a diagram illustrating a format of a file header of the encoded audio file of FIG. 3, according to one aspect of the present invention;

FIG. 5 is a diagram further illustrating a format of the file header of FIG. 4 according to one aspect of the present invention;

FIG. 6 is a diagram further illustrating a format of the file header of FIG. 4 according to one aspect of the present invention;

DETAILED DESCRIPTION OF PREFERRED EMBODIMENTS

Figure 1:
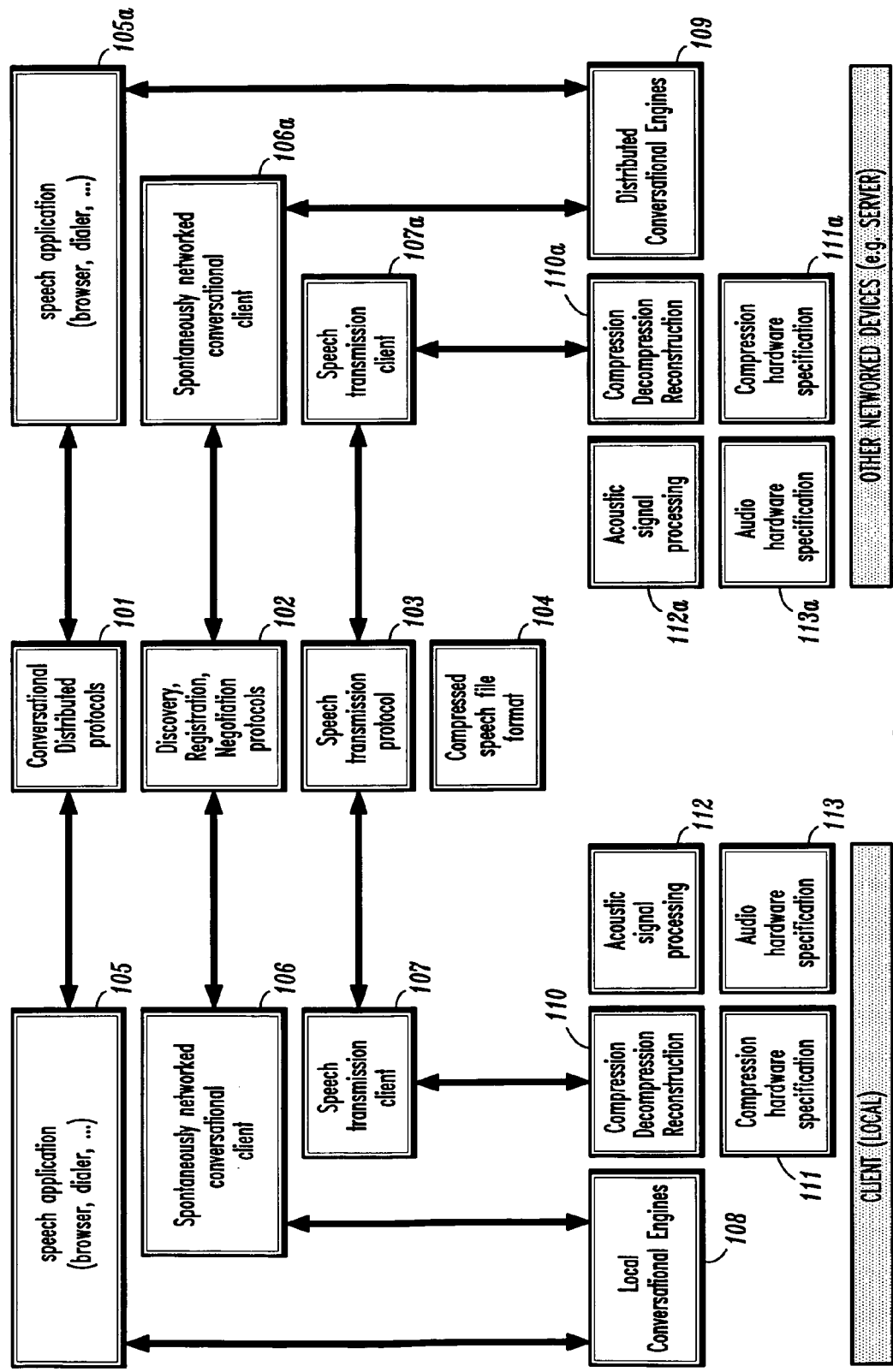
FIG. 1 is a diagram illustrating conversational protocols that may be utilized to support conversational computing according to one aspect of the present invention.

The present invention may be implemented in various forms of hardware, software, firmware, special purpose processors, or a combination thereof. Preferably, the invention is implemented in software as an application comprising program instructions that are tangibly embodied on one or more program storage devices (e.g., magnetic floppy disk, RAM, CD ROM, ROM and Flash memory) and executable by any device, machine or platform comprising suitable architecture. Since the invention is preferably implemented in software, the system architectures and method steps may differ depending upon the manner in which the invention is programmed. Given the teachings herein, one of ordinary skill in the related art will be able to contemplate these and similar implementations or configurations.

I. Overview

The present invention is directed to conversational protocols for implementing distributed conversational networking architectures and/or distributed conversational applications, as well as real-time conversational computing between network-connected pervasive computing devices and/or servers over a computer network. More specifically, the implementation of distributed conversational systems/applications according to the present invention is based in part on a suitably defined conversational coding, transport and control protocols.

There are three basic configurations for implementing conversational protocols in accordance with the present invention and the format of such conversational protocols will vary based on the underlying transport layers and desired application. In a preferred embodiment, conversational protocols for providing distributed conversational networking are implemented on top of RTP (Real Time Protocol). For example, as described in detail below, a conversational coding protocol according to one aspect of the present invention is implemented by extending RTP to produce what is referred to herein as RTCCP (real time conversational coding protocol).

As is known in the art, the real time protocol is a method for providing real time transmission of data over a network. RTP does not have all the functions of a transport protocol and is typically used on top of a network level protocol such as TCP (transmission control protocol) or UDP (User Datagram Protocol). TCP is known as a transport level protocol which controls the transmission and the flow of data between two hosts on a network. The TCP protocol may not be ideal in real-time implementations due to its data flow control and reliability mechanisms which can halt/interrupt the flow of data transmission over a network. More specifically, TCP provides reliability through a mechanism that ensures that every single datagram (or packet) is delivered. This mechanism involves assigning each datagram a sequence number and sequentially transmitting each datagram to a receiver. For a given transmitted datagram, if the receiver successfully receives the datagram (i.e., receives an undamaged datagram), the receiver will transmit an acknowledgment message (ACK) to inform the source that it has successfully received the datagram and to send the next sequential datagram. If, after transmitting a given datagram, the source does not receive an ACK message for the datagram, the source will continue to transmit the datagram until an ACK message is returned. Consequently, the flow of datagrams may be temporarily interrupted during transmission as the receiver waits for an undamaged datagram.

UDP is alternative protocol to TCP for use with RTP. The UDP does not utilize the reliability and flow control mechanisms of TCP but rather transmits the datagrams to the receiver in a continuous stream. Consequently, UDP is a preferred protocol for use with RTP for real-time implementations since it delivers a constant stream of datagrams without any significant delay (other than connection bandwidth and network congestion). Despite its lack of a reliably delivery mechanism, the implementation of conversational protocols on top of RTP using UDP in accordance with the present invention preferably employs a reliable delivery mechanism (usually at a relatively low bit rate) similar to TCP/IP, but not as restrictive as TCP. Indeed, as described in detail below, in the absence of TCP/IP, reliable packet delivery is emulated by providing a packet delivery confirmation and re-sending mechanism. Advantageously, the implementation of conversational protocols on top of RTP and UDP (with a reliability mechanism) affords real-time interaction when needed (e.g., when immediate user recognition is expected by the dialog or when the input must directly impact the state of the dialog). The present invention will provide a detailed embodiment of implementing conversational protocols using real time protocols.

It is to be understood that the conversational protocols described herein may be implemented as extensions to other transport mechanisms. For instance, the conversational protocols may be implemented on top of TCP/IP. This presents the advantage to be the most common type of transport protocol that is employed—It is the Internet transport protocol. While TCP/IP is the simplest default mechanism to transport data and control from one device to another using, e.g., FTP (file transfer protocol), RMI (remote method invocation), RPC (remote procedure call), etc., as explained above, it does not guarantee real-time interaction. Indeed, missing or damages packets are systematically waited for or re-sent. This may not be an issue for, e.g., deferred recognition tasks. For example, a form filling process in VoiceXML (http://www.voicexml.com), may not expect immediate speech recognition for each field that is filled, but only recognition upon submission of the entire form to the server. In any event, it is to be understood that a preferred embodiment of implementing RTP-based conversational protocols may utilize TCP/IP if the given application calls for guaranteed, but non-real time, transmission of the associated data packets.

In another aspect of the present invention, the conversational protocols may be implemented on top of HTTP (hypertext transfer protocol) (or WAP (wireless application protocol). HTTP is the main protocol used on the Internet for hypertext transfer (Web programming model), i.e., transferring data on the World Wide Web. The implementation of conversational protocols on top of HTTP allows direct integration of the engine distribution within browser solutions (e.g. http://www.voiceXML.com) with no major change required in the infrastructure. WAP is an equivalent lightweight transport protocol to use on wireless networks (devices with limited wireless bandwidth connections and limited GUI capabilities). Since HTTP is implemented on TCP/IP and has a significant amount of overhead associated therewith (e.g., most of the remote commands result in multiple exchanges various headers) and because WAP provides a reliable delivery mechanism, the implementation of RTP-based conversational protocols on top of HTTP and WAP is preferable for non-real time applications.

It is to be appreciated that the RTP mechanism is preferred when real-time interactions are required. Regardless of the implementation choice, however, the following design principles (definitions) are preferably considered herein for implementing a distributed network using conversational protocols according to the present invention. Conversational protocols according to one aspect of the present invention are preferably defined based on the following criteria:

- A suitable audio coding/decoding (Codec) protocol that provides, e.g., minimal distortion of acoustic front-end features and allows reconstruction of intelligible waveforms from compressed feature vectors of speech;
- Definition of a file format associated with the encoded audio data;
- Definition of a mechanism to select a coding scheme when multiple coding variations are available;
- Definition of a streaming mechanism for transmitting the encoded data over a network;
- Definition of a mechanism to switch the coding scheme during a stream transmission;
- Definition or specification of packet delivery mechanisms and a mechanism for reliable delivery of packets and recovering lost packets and/or disregarding damaged packets; and/or
- Definition of a mechanism for sending control data between network connected devices, machines and/or servers. This mechanism allows, for example, remote control of conversational engines.

As indicated above, conversational protocols are preferably implemented on top of RTP so as to minimize the dialog delays introduced by distributed processing. A preferred embodiment for implementing conversational protocols on top of RTP based on the above criteria will be explained in detail below. First, an overview of a preferred embodiment utilizing RTP-based conversational protocols in accordance with such criteria will now be given.

With respect to audio encoding and decoding mechanism and a file format for encoded audio data, the present invention preferably employs a well-defined conversational coding protocol comprising (1) a CODEC for encoding/decoding speech/audio data, which minimizes the distortion of the acoustic front-end features and allows reconstruction of intelligible waveforms and (2) a file format associated with the encoded speech/audio data (which is transmitted between network-connected devices/servers using a conversational transport mechanism discussed below). In a preferred embodiment, a conversational CODEC preferably compresses a cepstral feature stream while minimizing the distortion of the reconstructed features. In particular, any CODEC employing a compression scheme that minimizes the error rates of associated conversational engines and which allows for reconstruction/playback of the waveform in an intelligible manner (preferably in a perceptually acceptable manner) may be employed. For instance, any CODEC that compresses MEL cepstra feature vectors and adds pitch information is preferably employed.

A preferred CODEC is the Recognition-Compatible VoCoder (RECOVC) which is discussed in greater detail below with reference to FIG. 2. Briefly, the preferred RECOVC system provides compression of the speech feature vectors such that, e.g., server-side speech recognition is not impaired, as well as reconstruction of a good quality, intelligible speech from the compressed speech feature vectors.

Advantageously, when an audio subsystem of a client device employs an audio CODEC having the specific, well defined characteristics (as described above) for capturing and processing speech prior to transmission to a remote server for server-side processing, the main factors that affect the audio characteristics are related to the source and its acoustic environment. This minimizes the degradation of server-side audio processing, thereby providing increased accuracy of complex conversational tasks such as speech recognition and speaker recognition.

In addition, any file format for the encoded audio data that comprises a header which defines information such as the compression algorithm, the size of the file, the audio parameters (feature type and dimension, sampling frequency, compression scheme), as well as other meta-information, if needed, such as language type and ancillary transformation information may be employed herein. In a preferred embodiment described in detail below with reference to FIGS. 3–6, a preferred file format comprises a plurality of Blocks, each comprising compressed feature vectors of, e.g., several successive 10 msec audio frames, in such a way that each Block can be independently decompressed, thereby allowing a receiver to commence decompression from the middle of the file and/or skip damaged or missing data. Several Blocks are packed in a Segment with a Segment Header indicating the content type. Furthermore, as discussed in detail below, the preferred file format defines Speech, Silence, Ancillary Data and an End-of-Stream Segments.

Furthermore, with respect to a streaming mechanism for minimizing the dialog delays introduced by remote processing, the present invention preferably employs RTP by extending the RTP header to enclose the CODEC file format. The resulting stream is referred to herein as RTCCP (Real Time Conversational Coding Protocol). This streaming mechanism is discussed in greater detail below with reference to, e.g., FIGS. 7, 8, 9 and 10. It is to be understood that the coded speech may also be encrypted to guarantee confidentiality (wherein encryption may be indicated in the header).

Next, with respect to a mechanism for selecting the coding schemes, the present invention preferably utilizes the H.245 control standard by extending H.245 to include any supported conversational protocols. It is to be understood, however, that other protocols similar to H.323 (e.g., SIP) may be utilized.

Moreover, with respect to a control mechanism, a preferred embodiment comprises extending RTCP (Real Time Control Protocol) to produce what is referred to herein as RTCCtP (Real Time Conversational Control Protocol). In particular, RTCCtP extends the functions of RTCP to provide a mechanism for selecting/switching the coding scheme in the middle of a stream transmission and for notification and confirmation. A preferred embodiment of RTCCtP is discussed below with reference to FIG. 12. With respect to packet delivery, the present invention preferably utilizes the reliability mechanisms of UDP and/or TCP or, in the absence of UDP or TCP, emulates functions similar to such protocols to recover lost packets and/or disregard packets. It is to be understood that any messaging to confirm delivery of packets can be used when reliable UDP or TCP is not available. This affects only the control layer. For instance, in case of lost packets, when reliability is needed, the unconfirmed packet can be requested and retransmitted.

Furthermore, with respect to a mechanism for sending control data between the client and the speech server, the present invention preferably employs an extension of RTCP (i.e. an extension of RTCCtP) to add the extra information, to produce a control stream that is referred to herein as RTCDP (Real Time Conversational Distributed Protocol). Preferably, the control stream comprises any one or combination of the following: information about the data file (e.g., what data file to use and where to get it from); a description of the type of processing to apply (e.g., algorithm string—sequence of actions to perform on the input or output by the conversational engines); the expected type and format of the results; an address where to return the results; exception handling mechanisms; I/O event notifications (e.g. for a distributed multi-modal browser); and/or modality specific view updates (e.g. ML (markup language) pushes to the modality specific viewing browsers in the multi-modal browser case).

It is to be understood that in a Voice over IP environment comprising RSVP (Resource Reservation Protocol), the RSVP can be employed to allow pre-reservation of specific bandwidth and quality of service between two locations on the network so as to provide extra capability of traffic management.

Referring to FIG. 1, a block diagram illustrates conversational protocols that may be implemented using the mechanisms/protocols described herein to support conversational computing and distributed architectures. The implementation of conversational protocols to provide distributed conversational computing, as well as the concepts and architecture to support uniform, coordinated conversational computing across a plurality of network connected pervasive computing devices and servers via universal and coordinated conversational user interfaces (as provided via a conversational virtual machine (CVM)), are described in detail, for example, in International Appl. No. PCT/US99/22927, filed on Oct. 1, 1999, entitled: "Conversational Computing Via Conversational Virtual Machine," which is commonly assigned, and fully incorporated herein by reference (which claims priority from U.S. Provisional Patent Application Ser. Nos. 60/102,957, filed Oct. 2, 1998, and 60/117,595, filed Jan. 27, 1999, which are commonly assigned and the disclosures of which are also expressly incorporated herein by reference). A CVM platform may be employed herein to present consistent conversational services and behavior to the user and the application developer who can directly use these services and the platform interfaces to build conversational applications.

Furthermore, the implementation of such conversational protocols in a distributed environment to provide automatic and coordinated sharing of conversational functions and resources between local and remote applications/devices/servers (without implementing a CVM platform) is described in detail, for example, in International Application No. PCT/US99/22925, filed on Oct. 1, 1999, entitled "*System and Method For Providing Network Coordinated Conversational Services*," which is commonly assigned and incorporated herein by reference.

Briefly, referring to FIG. 1, conversational protocols for implementing a distributed network architecture preferably comprise conversational distributed protocols 101, discovery, registration, and negotiation protocols 102 and a speech transmission (or conversational coding) protocol 103. In a preferred embodiment, the present invention addresses the real-time implementation of the conversational coding protocol 103 and conversational distributed protocols 101 (as well as other extensions using other Internet transport mechanisms for non real-time implementations). The implementation of real-time transmission of discovery, registration and negotiation protocols is not necessary in all instances, but nevertheless may be implemented on top of RTP in accordance with the teachings herein. Real-time negotiation can occur during the network connection and, consequently, the negotiation protocols can implemented on top of RTDCP (an other real-time control data stream structures described below).

The conversational distributed protocols 101 allow networked (distributed) conversational applications 105, 105a and network-connected devices (local client and other networked devices such as a server) to, e.g., register their current conversational state, arguments (data files) and context, share local and distributed conversational engines 108, 109 between network connected devices (e.g., client/server), and otherwise exchange information to coordinate a "conversation" involving multiple devices or applications including master/salve conversational network, peer conversational network, and silent partners.

The information that may be exchanged between networked devices using the conversational distributed protocols 101 comprises pointers to data files (arguments), transfer (if needed) of data files and other conversational arguments, notification for input, output events and recognition results, conversational engine API calls and results, notification of state and context changes and other system events, registration updates: handshake for registration, negotiation updates: handshake for negotiation, and discovery updates when a requested resource is lost.

Preferably, the conversational distributed protocols 101 also comprise dialog management (DM) protocols that provide a mechanism for exchanging information between dialog managers (DMs) of networked devices. For example, in a distributed environment, dialog management protocols are used for exchanging information to determine which dialog manager will execute a given function. Typically, different devices, CVMs or different applications will have their own dialog manager and context stack. Through the exchange of information via DM protocols, the different dialog managers involved in a dialog session will negotiate a topology with a master dialog manager and slave or peer dialog managers, wherein the active master dialog manager will be responsible for managing the flow of I/O to the different managers to decide the active dialog and appropriately execute a query and update the context and/or history. For instance, the following information can be exchanged: (1) DM architecture registration (e.g., each DM can be a collection of locals DMs); (2) pointers to associated meta-information (user, device capabilities, application needs, etc.); (3) negotiation of DM network topology (e.g., master/slave, peer-to-peer); (4) data files (conversational arguments) if applicable (e.g., if engines are used that are controlled by a master DM); (5) notification of I/O events such as user input, outputs to users for transfer to engines and/or addition to contexts; (6) notification of recognition events; (7) transfer of processed input from engines to a master DM; (8) transfer of responsibility of master DM to registered DMs; (9) DM processing result events; (10) DM exceptions; (11) transfer of confidence and ambiguity results, proposed feedback and output, proposed expectation state, proposed action, proposed context changes, proposed new dialog state; (12) decision notification, context update, action update, state update, etc.; (13) notification of completed, failed or interrupted action; (14) notification of context changes; and/or (15) data files, context and state updates due to action.

In a preferred embodiment of the present invention, the distributed conversational protocols 101 are implemented via extensions of RTP/RTCP (as described below). In another aspect, the distributed conversational protocols may be implemented on top of TCP via RMI (remote method invocation) or RPC (remote procedure call) system calls to implement the calls between the applications and the different conversational engines over the network. As is known in the art, RPC is a protocol that allows one application to request a service from another application across the network. Similarly, RMI is a method by which objects can interact in a distributed network. RMI allows one or more objects to be passed along with the request.

Although the distributed conversational protocols may be implemented via RMI/RPC (as well as DCOM/ActiveX, Cobra, etc.), RTP is preferred because, e.g., RTP (i) takes advantage of the existing/emerging framework of Voice over IP (land and wireless), (ii) provides an open standard approach, (iii) does not make any assumptions on the OS/platform of the different entities, (iv) does not make any assumptions on the engines or APIs used by the different entities, and (v) can take advantage of the functions and services offered in the Voice Over IP framework and (vi) allows (when not encrypted) a third party and intermediary to appropriately modify and/or prepare the RTP stream to increase or improve the user experience.

The speech transmission protocol 103 (or conversational coding protocol) are used by speech transmission clients 107, 107a to transmit compressed speech (compressed speech file format 104 discussed below) to other networked devices, systems or applications for processing. The speech transmission clients 107, 107a operate in conjunction with compression, decompression and reconstruction engines 110, 110a (preferably using the CODEC techniques described below) and suitable compression hardware 111, 111a for processing the speech (e.g., speech file 104) transmitted over the network. As described below, the speech coders 110, 110a provide perceptually acceptable or intelligible reconstruction of the compressed speech and optimized conversational performance (e.g., word error rate). The speech is captured (and transformed into features) on the respective networked devices using acoustic signal processing engines (audio subsystems) 112, 112a and suitable audio hardware 113, 113a.

In addition, a compressed speech file format 104 can be transmitted/streamed between devices for distributed speech processing using one of the real-time streaming methods described herein in accordance with the present invention. More specifically, the speech transmission protocol 104 allow the devices to transmit compressed speech or local processing results to other devices and applications on the network. In a preferred embodiment, after the handshake process between a source device and a receiver device, a data stream (packet based) is sent to the receiver. The packet headers preferably specify the coding scheme and coding arguments (i.e. sampling frequency, feature characteristics, vector dimensions, feature transformation/family, etc. In addition, error correcting information can also be introduced (e.g. last feature vector of the previous packet to correct the differential decoders if the previous packet is lost or delayed), or appropriate messaging to recover (re-send) lost packets.

The conversational protocols further comprise conversational discovery (detection), registration, and negotiation protocols (or methods) 102. The registration protocols allow networked devices or applications to exchange and register information regarding their conversational capabilities, state/context and arguments, so as to limit data transfer between the devices to relevant information and negotiate the master/slave or peer networking. By way of example, the registration protocols allow the following information to be exchanged: (1) capabilities and load messages including definition and update events; (2) engine resources (whether a given device includes NLU, DM, NLG, TTS, speaker recognition, speech recognition compression, coding, storage, etc.); (3) I/O capabilities (e.g., GUI, Voice, HTML, etc.); (4) CPU, memory, and load capabilities; (5) data file types (domain specific, dictionary, language models, languages, etc.); (6) network addresses and features; (7) information about a user (definition and update events); (8) user preferences for the device, application or dialog; (9) customization; (10) user experience; (11) help; (12) capability requirements per application (and application state) (definition and update events); (13) meta information for CUI services and behaviors (help files, categories, conversational priorities, etc.) (definition and update events, typically via pointer to table); (14) protocol handshakes; and/or (15) topology negotiation.

Registration may be performed using a traditional communication protocol such as TCP/IP, TCP/IP 29, JINI, T-Space, X-10 or CEBus, and socket communication between devices. The devices use a distributed conversational architecture to exchange information such as their conversational arguments (e.g., active vocabulary, grammars and language models, parsing and translation/tagging models, voice prints, synthesis rules, baseforms (pronunciation rules) and voice fonts). This information is either passed as files or streams to, e.g., a CVM controller and the conversational engines, or as URLs. In one embodiment for implementing the registration protocols, upon connection, the devices can exchange information about their conversational capabilities with a prearranged protocol (e.g., TTS English, any text, Speech recognition, 500 words and FSG grammar, no speaker recognition, etc.) by exchanging a set of flags or a device property object. Likewise, applications can exchange engine requirement lists. With a master/slave network configuration, the master dialog manager can compile all the lists and match the functions and needs with conversational capabilities. In addition, context information may be transmitted by indicating passing or pointing to the context stack/history of the device or application that the controller can access and add to its context stack. Devices can also pass information about their multi-modal I/O and UI capabilities (screen/no screen, audio in and out capabilities, keyboard, etc.) The conversational arguments allow a dialog engine to estimate the relevance of a new query by the NLU engine, based on the current state and context.

The conversational discovery protocols 102 are utilized by spontaneously networked conversational clients 106, 106a of the devices to automatically discover local or network conversationally aware systems and dynamically and spontaneously network-connect such conversationally aware systems. The information that is exchanged via the discovery protocols comprises the following: (1) broadcast requests for handshake or listening for requests; (2) exchange of device identifiers; (3) exchange of handles/pointer for first registration; and (4) exchange of handles for first negotiation. Discovery may also be implemented by accessing a central repository that comprises a description of the registered devices (via, e.g., LDAP (lightweight directory access protocol) or a home page/server that lists the registered devices).

Furthermore, the negotiation protocols 102 allow the negotiation between master/slave or peer networking so as to provide the appropriate coordination between, e.g., multiple CVM systems in dynamic master-slave and peer-to-peer interactions. More specifically, multiple CVM devices when registering will add to the conversational registration capability, information pertaining to, e.g., their controlling capability, the conversational engines that they have access to, and applications and devices that have registered with them and that they control. Based on their UI, I/O capabilities and active I/O, one CVM controller becomes the master and the other CVM controllers act as slaves, which is equivalent relatively to the master as being registered applications until a new negotiation occurs. The role of master and slave can be dynamically switched based on the active I/O modality or device or based on the active application.

II. Conversational Codec

Figure 2A:
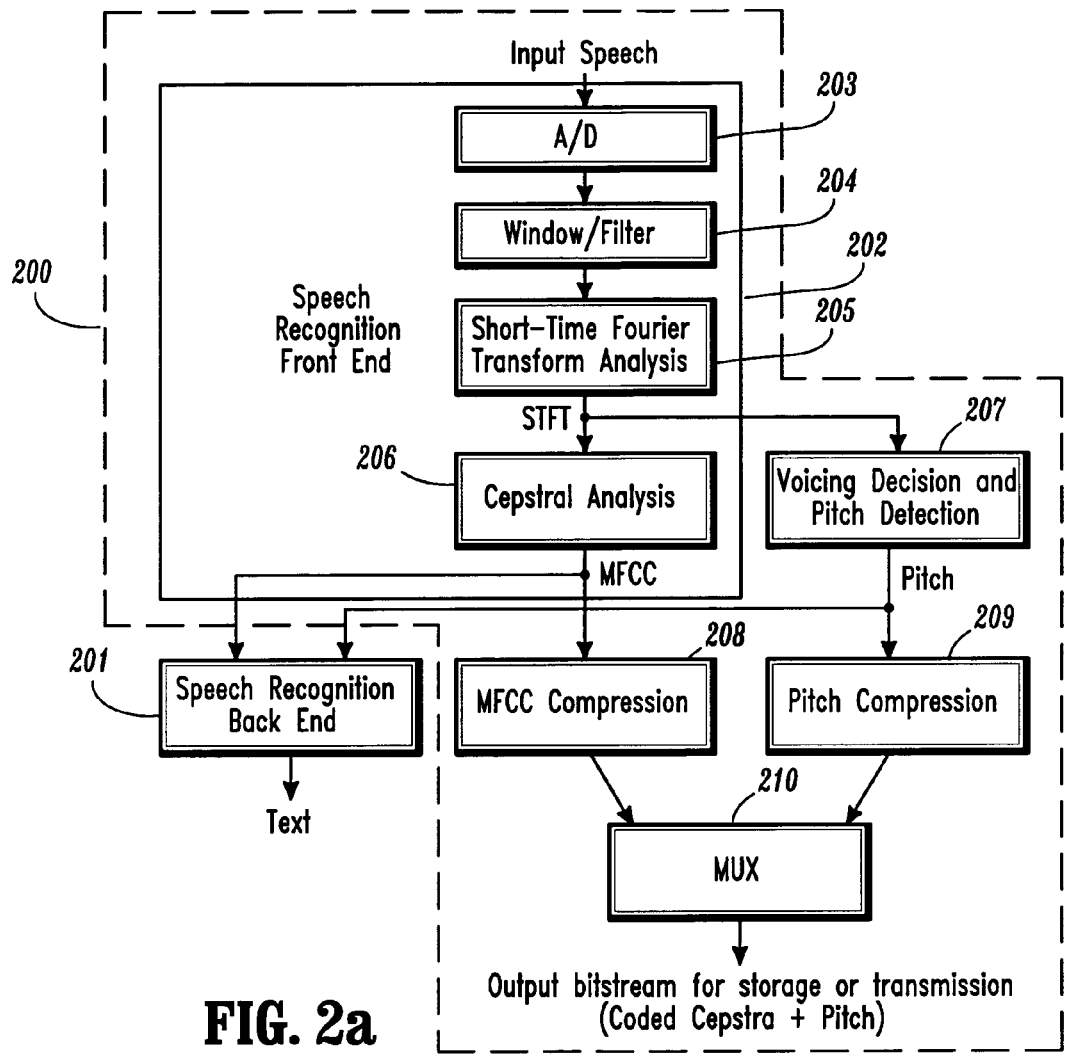
FIGS. 2a and 2b comprise a diagram of a system/method for encoding/decoding (CODEC) audio data according to an embodiment of the present invention.
Figure 2B:
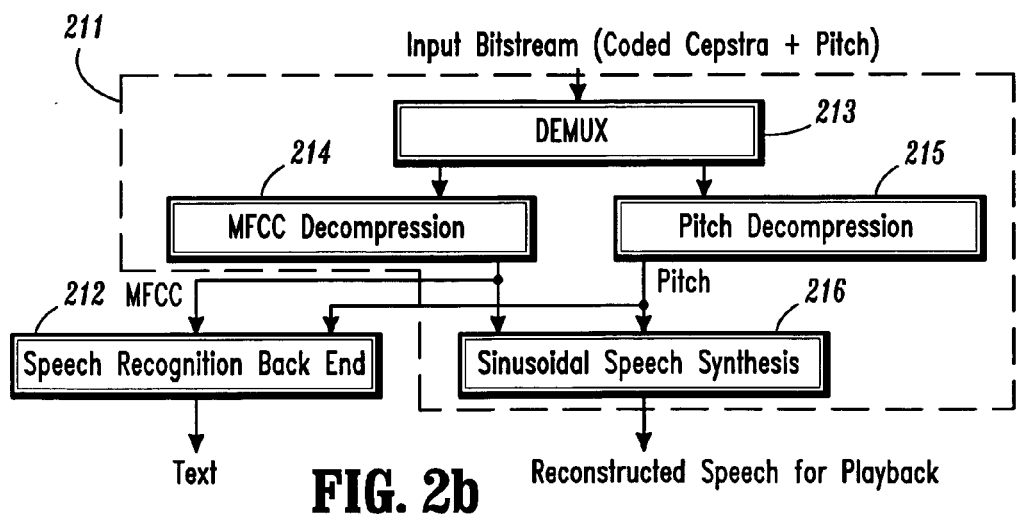

As indicated above, one component of conversational protocols for implementing for distributed conversational networking comprises a suitable audio coding/decoding (Codec) protocol. Referring now to FIGS. 2a and 2b, a block diagram illustrates an audio CODEC (coder/decoder) system which may be employed for use with the present invention for encoding/decoding speech data that is transmitted using the conversational protocols and methods described herein according to the present invention. More specifically, in a preferred embodiment, the CODEC depicted in FIG. 2 is a Speech-Recognition Compatible Voice Coder RECOVC™ (RECOVC is a registered trademark of International Business Machines Corporation). The RECOVC™ system developed by IBM Corporation addresses various issues including:

1. Compression of speech recognition feature vectors, such that recognition rates are not impaired; and
2. Reconstruction of a good quality, intelligible speech from the speech recognition feature vectors.

A detailed discussion of components of the RECOVC system depicted in FIG. 2 can be found in U.S. Pat. No. 6,009,387, issued on Dec. 28, 1999 to Ramaswamy, et al., entitled "*System and Method Of Compression/Decompressing A Speech Signal By Using Split Vector Quantization And Scalar Quantization,*" and U.S. application Ser. No. 09/410,085, filed on Oct. 1, 1999, entitled "*Method and System For Low Bit Rate Speech Coding Using Speech Recognition Features,*" now abandoned which are commonly assigned and fully incorporated herein by reference. The RECOVC may be operated in two modes. A first mode comprises a full RECOVC implementation employing compression and speech reconstruction. A second mode of operation comprises feature vector compression and decompression only, without speech reconstruction. A brief summary of the RECOVC™ system according to one embodiment will now be provided.

FIG. 2a depicts a block diagram of an encoding portion 200 of a RECOVC codec according to one embodiment, optionally coupled with a speech recognition engine 201 (located on e.g., a client device) for converting input speech into text. An input speech signal is fed into an acoustic front-end 202) comprising an analog-to-digital (A/D) converter (203), a window/filter module (204), a short-time fourier transform analysis (STFT) module (205) and a cepstral analysis module (206). The analog input speech signal is digitized by the A/D converter 203 and partitioned into short duration frames (typically 10 ms) via the window/filter module (204). A feature vector is produced for each frame of digitized input speech. It is to be understood that any suitable feature extraction method may be implemented herein such as IBM's ViaVoice™ system, or any other voice recognition systems implementing a Short-Time Fourier Transform (STFT) analysis (205) and cepstral analysis (206) process for extracting the mel-frequency cepstral coefficient (MFCC) feature vector (which represents the spectral envelope of the speech). The MFCC feature vectors can then be used by the speech recognition "back-end" (201) for converting the input speech signal into text.

The MFCC feature vectors are preferably compressed via MFCC compression module (208) using any technique known to those skilled in the art that provides compression without effecting the performance of the speech recognition system. Preferably, the compression module 208 preferably implements the compression scheme disclosed in the above-incorporated U.S. Pat. No. 6,009,387 (although other suitable compression schemes may be utilized). The compression scheme disclosed in this patent utilizes a first order prediction, multistage split VQ technique. Preferably, the bit rates are in the range 4–6.4 kbps, depending on the size of the MFCC feature vector. It is to be appreciated that the preferred compression approach is flexible in terms of acoustic feature characteristics such as dimensions or sampling rates. It is to be further appreciated that when used in combination of robust front-ends, the features may be compressed prior to transformation. The transformations are transmitted separately as described in detail below. On the receiving end, the transformations are applied after decompression.

To provide speech reconstruction and playback using the MFCC feature vectors, an additional pitch frequency information (including voiced/unvoiced decisions) is extracted for every frame of speech data via a voice decision and pitch detection module (207) together with the respective MFCC feature vector. It is to be appreciated that the pitch data is efficiently calculated from the STFT module 205 using a spectral peak detection process. It is to be understood that for some speech recognition systems, especially for tonal languages (e.g. Mandarin Chinese), the pitch information that is used for recognition and pitch detection is already implemented as a part of the front-end process.

The pitch period values are compressed at bit rates of 300–500 bps via a pitch compression module 209. The streams of compressed MFCC feature vectors and the compressed pitch are multiplexed via MUX 210 to form an output bitstream (of coded cepstra and pitch) for storage and/or transmission.

Referring now to FIG. 2b, a block diagram illustrates a speech decoder 211 of a RECOVC™ CODEC according to one embodiment which generates a reconstructed speech signal (for playback) of the encoded bitstream generated by the encoder 200. The decoder 211 is optionally coupled with a speech recognition engine 212 for converting the decompressed speech to text. The encoded input bit stream is fed into a de-multiplexer (213) which separates the bit stream into a stream of compressed MFCC feature vectors and a stream of compressed pitch. The MFCC vectors are decompressed via decompression module (214) (using the techniques described in the above-incorporated U.S. Pat. No. 6,009,387). A pitch decompression module (215) decompresses the encoded pitch information if playback of the speech is required or if pitch is needed for the speech recognition process (212).

It is to be appreciated that the speech for playback is reconstructed from the decoded MFCC feature vectors and the decoded pitch values via a sinusoidal speech synthesis module 216, which preferably employs a novel, low complexity, frequency domain reconstruction method described in detail in the above-incorporated patent application U.S.

Ser. No. 09/410,085. The reconstruction is performed using a sinusoidal speech model (such as described by R. Mc Aulay et al., Sinusoidal Coding, Speech Coding and Synthesis, Chapter 4, pages 121–170, Elsevier, 1995.) The values of the model parameters are determined such that the reconstructed speech has an MFCC feature vector similar to the decoded MFCC feature vector, and a pitch similar to the decoded pitch. This is sufficient to reconstruct natural sounding, good quality, intelligible speech with the voice of the original speaker.

It is to be appreciated that the RECOVC system described above using a cepstral feature compression scheme minimizes the level of degradation of the performances of a conversational task performed on the decompressed feature stream. The preferred compression scheme is a key basic element of conversational networking. It is to be understood, however, that any suitable coding scheme that compresses the cepstral feature stream while minimizing the distortion of the reconstructed features may be used herein. In addition, for practical purposes, a preferred coding scheme for use in conversational distributed environment is one that supports reconstruction of intelligible waveforms. Indeed, this reconstruction is useful for later playback from the server or playback from the client (if stored locally) or for subsequently proofreading the transcription, error correction, or human monitoring of the process. Accordingly, any conversational CODEC that minimizes the distortion of the acoustic front-end features and allows reconstruction of intelligible waveforms may be employed herein. For example, any conventional CODEC combined with an acoustic feature error correction/minimization scheme would fit the definition. Preferably, such coding schemes should provide data rates as low as between 4 kbits/s and 5 kbit/s with no degradation of the recognition performances. As a result, interactive exchanges can be performed in real time with the back-end (server) resources even over wireless modems or wireless data links.

It is to be understood that although a preferred CODEC system and method is described above, it is to be appreciated that the transmission of speech from the local client to a remote network-connected server (or vice versa) can be performed using other techniques depending on the circumstances and desired results. For instance, there can be direct transmission of the waveform as a file, a stream or a stream of packets. In addition, a compressed waveform may be transmitted using conventional methods such as ADPCM and APC. Furthermore, a stream of features can be transmitted in accordance with the method disclosed in "Compression Of Acoustic Features For Speech Recognition In Network Environments," by G. Ramaswamy et al., Vol. 2, pp. 977–980, Proc. ICASSP, 1998, which is incorporated herein by reference. This method allows recognition (speech recognition, speaker recognition or NLU) on the receiver side but no reconstruction of the signal.

III. Conversational Coding Protocols (A) File Format

Figure 3:
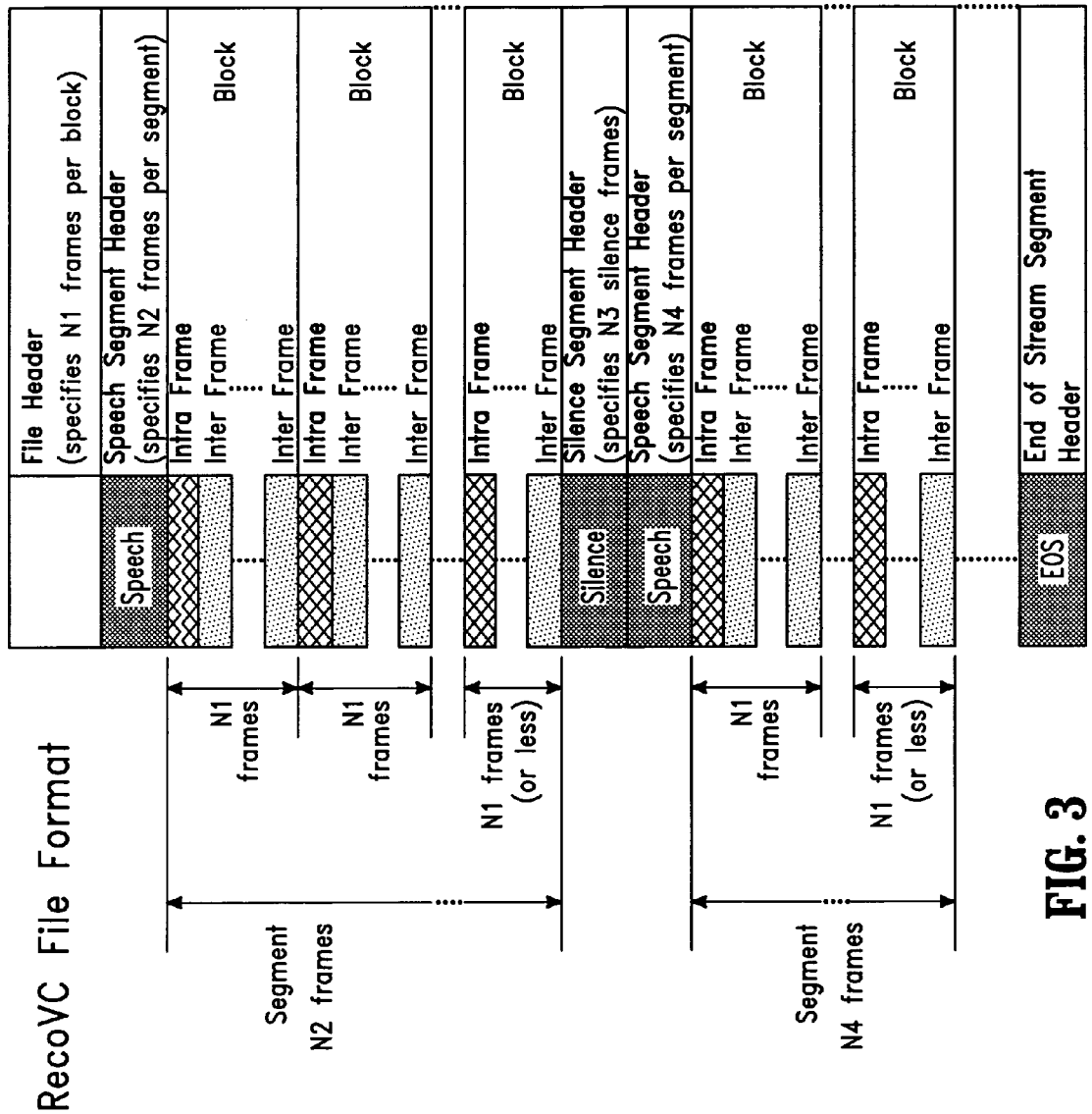
FIG. 3 is a diagram illustrating a file format for encoded audio data according to one aspect of the present invention.

As indicated above, one component for defining a conversational coding protocol comprises a definition of the file format that is associated with the encoded data. In a preferred embodiment, the CODEC system and method (and feature compression scheme) described above (i.e., RECOVC) is used for generating an internal file format that can be utilized for real-time distributed conversational interactions. Referring now to FIG. 3, a block diagram illustrates a RECOVC file format according to an embodiment of the present invention (which may be referred to herein as "RECOVC.xxx"). It is to be appreciated that a preferred RECOVC file format according to the present invention enables transmission of different segments of speech. As illustrated in FIG. 3, a preferred RECOVC.xxx file format comprises a File Header which, in general, defines information regarding, e.g., the compression scheme, the size of the file, the audio parameters (feature type and dimension), sampling frequency, and other meta-information such as language type, encryption information and ancillary transformation information regarding transformation of the speech signal, if needed, etc. It is to be understood that although the RECOVC.xxx file format is preferred, other file formats may be employed herein comprising a structure that provides the above-mentioned meta-information.

A preferred format of the RECOVC file comprises a plurality of Blocks, each comprising compressed feature vectors of several successive 10 msec audio frames, for example. More specifically, in a preferred embodiment, each Block comprises a single IntraFrame (comprising uncompressed or losslessly compressed) speech features and one or more InterFrames having speech data coded using RECOVC. More specifically, an IntraFrame is the first frame of a Block that is preferably non-encoded or, alternatively encoded by different schemes that guarantees that the IntraFrame can be recovered/reconstructed, even if previous blocks or frames have been corrupted. Moreover, an InterFrame is a frame between IntraFrames. The InterFrames may be coded differently than the IntraFrames, as it may be less critical to have them corrupted (since the stream will be recovered at the next IntraFrame. Robust encoding, including error correcting codes may be used for the InterFrames.

The (maximum) number of frames N1 for each Block is specified in the File Header. The feature vectors are stored in Blocks in such a way that each Block can be decompressed on its own. It is to be appreciated that this allows decompression to be performed at any portion (e.g., the middle) of the RECOVC File, as well as skipping damaged or missing data.

The RECOVC File further comprises one or more Segments, comprising, e.g., speech and silence segments, all of which are preceded by a corresponding Segment Header. For instance, each speech Segment comprises several Blocks and a Speech Segment Header indicating the type of content (e.g., speech). The Speech Segment Header specifies the number of frames (N2, N4) per speech Segment. The RECOVC file further comprises one or more of Silence Segments and EOS Segments (end-of-stream), as well as ancillary data segments that may be defined depending on the application.

Referring now to FIG. 4, a diagram illustrates information that is preferably included within a File Header of a RECOVC file according to the present invention. The File Header comprises a plurality of fields, some of which are mandatory and some of which are optional. For example, the Header Length comprises a 2 byte field that indicates the total number of bytes in the File Header. A Frame Duration field comprises a 1 byte field that comprises an index to a Frame Duration Table illustrated in FIG. 5. The Frame Duration Table comprises a plurality of Codes each specifying the duration (in msec) of each frame of speech. A Frames Per Block field comprise a 1 byte field having a value that specifies the maximum number of allowed frames per Block. Each Block (FIG. 3) may comprise only one Intra-Frame, or one Intra-Frame and one or more Inter-Frames. A Sampling Rate field comprises a 1 byte field that provides an index value to a Sampling Rate Table (FIG. 5).

The Sampling Rate Table comprises a plurality of Codes each specifying the input sampling rate (Hz) of the speech data.

A Cepstra Dimension field (FIG. 4) comprises a 1 byte field having index value to a Cepstra Vector/Type Table (FIG. 5). The Cepstra Vector/Type Table comprises a plurality of codes each specifying a dimension of the cepstral feature vectors. A Language field comprises a 1 byte field having index value to a Language Table. The Language Table comprises one or more codes each specifying a language of the encoded speech data. A Profile field comprises a 1 byte field having an index value to a Profile Table (as illustrated in FIG. 6). The Profile Table comprises a plurality of codes each specifying, e.g., whether the speech data contains information that enables recognition only or recognition and reconstruction of the speech data.

Referring to FIG. 6, the Speech and Silence Segment Headers (shown in FIG. 3) preferably comprise a 5 byte field comprising a 1 byte Segment Type field and a 4 byte Number Of Frames field. The Segment Type field comprises a index value in a Segment Type Table indicating the type of Segment (speech or silence). If speech is included is a given Segment, a Speech Segment Header will specify the number of frames for the given Segment. If speech is not included in a given silence Segment, the silence Segment does not need to be transmitted. If the given silence Segment is transmitted, is can be marked via a Silence Segment Header that specifies the number of silence frames for the given silence Segment (which can then be ignored by a recognition engine on the receiver of the data stream.

The Number of Frames field comprises a value that indicates the total number of frames of the corresponding Segment. As further illustrated in FIG. 6, EOS Headers and Data Segment Headers preferably comprise a 5 byte (minimum) field comprising a 1 byte Segment Type field and a 4 byte Segment Length field. The Segment Type field comprises an index value to a Segment Type table indicating the type of segment (EOS or Data). The Segment Length field includes a value that indicates the total number of bytes of the corresponding Segment. In addition, Ancillary Data with corresponding segment header, etc., may be defined and incorporated into the RECOVC file format accordingly.

(B) Conversational Streaming and Control Mechanisms

As indicated above, a suitably defined streaming mechanism is implemented to transmit the RECOVC file for distributed conversational applications. Packetization of the RECOVC file format is preferably achieved by buffering the data stream block by block (and initially sending the header). Typically with 300 ms packets, the data rate can be as low as 4 kbit/s (4.5 kbit/s when reconstruction of the waveform is not required). This is sufficient for real-time low bit rate transmission even over wireless modem and real-time interaction. Packetization will be discussed in detail below.

In a preferred embodiment, packet transmission of a RECOVC data stream (as shown in FIG. 3) for wireless, UDP, TCP/IP, HTTP and Voice over IP networks is implemented using a conventional RTP (Real-time Transport Protocol) to wrap the resulting RECOVC data stream. The term RTCCP (Real-time Conversational Coding Protocol) is used herein to refer to a RECOVC data stream that is wrapped in a conventional RTP stream. As is known in the art, RTP is a standardized protocol that provides end-to-end network transport functions suitable for applications transmitting real-time data such as audio or video over a network (e.g., distributed applications). RTP does not provide a mechanism to ensure timely delivery of the data or provide other quality of service guarantees, but relies on lower-layer services for such services. As is further known in the art, the data transmission (via RTP) is augmented by RTCP (RTP control protocol) that allows monitoring of the data delivery and provides minimal control and identification functionality. In accordance with a preferred embodiment of the present invention, RTP is extended through modifications and/or additions to the headers as necessary for incorporating the RECOVC File format to provide real-time streaming of the RECOVC data.

Figure 7:
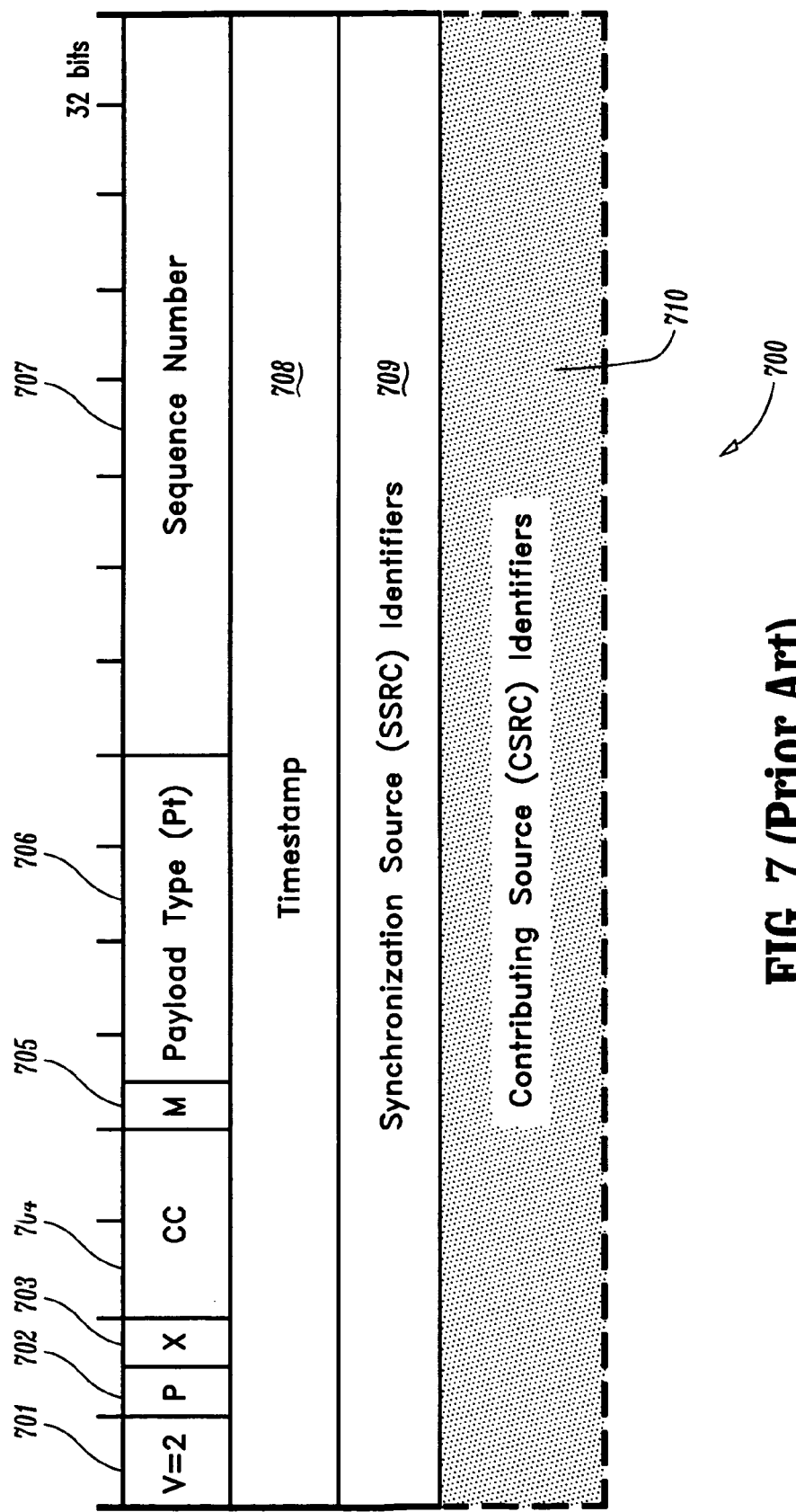
FIG. 7 is a diagram illustrating a conventional format for RTP (Real Time Protocol)

A brief discussion of a standard RTP protocol will now be provided with reference to the diagram of FIG. 7, which illustrates a format of an RTP Header 700 according to the prior art. The RTP header 700 is a conventional RTP header where an extension capability of the RTP header is utilized to add the RecoVC information. The first 12 bytes (96 bits) of the RTP header 700 (or fixed header) are included in every RTP packet, while a list of CSRC (contributing source) identifiers 710 may be included when inserted by a mixer (as is known in the art, a mixer is an intermediate system that receives RTP packets from one or more sources, processes the packets as necessary, and combines the packets in some manner and then forwards a new RTP packet).

The RTP header 700 comprises a version number field 701 (2 bits) which identifies the version of RTP. The most current version of RTP is version "2". A padding (P) field 702 comprises a 1 bit field, whereby if the padding bit is set, this indicates that the packet contains one or more additional padding bytes at the end which are not part of the payload. The last byte of the padding contains a count of the number of padding bytes that should be ignored. This padding (bytes of value 0) is added to the end of the payload of an RTP packet so as to maintain the 32-bit fields aligned at offsets divisible by four.

An extension (X) field 703 is a one bit field that is set to indicate that a variable-length header extension is appended to the RTP header, following the CSRC list 710 (if present). A CSRC count (CC) field is a 4 bit field that indicates the number of CSRC identifiers that follow the fixed header (i.e., the first 12 bytes). A marker (M) field 705 is a 1 bit field that carries profile-specific information. A profile specifies a default static mapping of payload type codes to payload formations. The marker is intended to allow significant events such as frame boundaries to be marked in the packet stream. A profile may define additional maker bits or specify that there is no marker bit by changing the number of bits in the payload type field 706.

The payload type field 706 is a 7 bit field that identifies the format of the RTP payload and determines its interpretation by the application. The RTP payload is the data transported by RTP in a packet. As indicated above, a profile specifies a default static mapping of payload type codes to payload formats.

A sequence number field 707 is a 16 bit field that comprises a sequence number of the RTP packet. The sequence numbers allows the receiver to reconstruct the sender's packet sequence. The sequence numbers may also be used to determine the proper location of a packet, for example in audio decoding, without necessarily decoding packets in sequence. The sequence number increments by one for each RTP data packet that is sent, and may be used by the receiver to detect packet loss and to restore packet sequence.

A time stamp field 708 is a 32 bit field that indicates the time of sampling of the first byte in the RTP data packet. The time stamp may be derived via NTP (network time protocol)

or other clocking methods known to those skilled in the art for providing synchronization depending on the application.

A synchronization source (SSRC) identifiers field 709 is a 32 bit field that indicates the synchronization source of a stream of RTP packets. This identifier is chosen randomly and is identified by a 32-bit numeric SSRC identifier carried in the RTP header so as not to be dependent upon the network address.

The CSRC identifiers 710 field is a 32 bit field that identifies the contributing sources, if any, for the payload contained in the packet. A source of stream of RTP packets that has contributed to the combined stream produced by an RTP mixer. The mixer inserts a list of the SSRC identifiers of the sources that contributed to the generation of the particular packet into the RTP header of that packet. An example application is audio conferencing where a mixer indicates all the persons who speech was combined to produce the outgoing packet so that the receiver can determine the current talker, even though all the audio packets contain the same SSRC identifier (i.e., the SSRC identifier of the mixer).

In accordance with a preferred embodiment of the present invention, the RTP format described above with reference to FIG. 7 is extended to encompass the RECOVC data stream discussed above with respect to, e.g., FIG. 3. More specifically, profile-specific modifications may be made to the RTP header 700 of FIG. 7 based on the profile of the RECOVC format to generate what is referred to herein as RTCCP.

Figure 8:
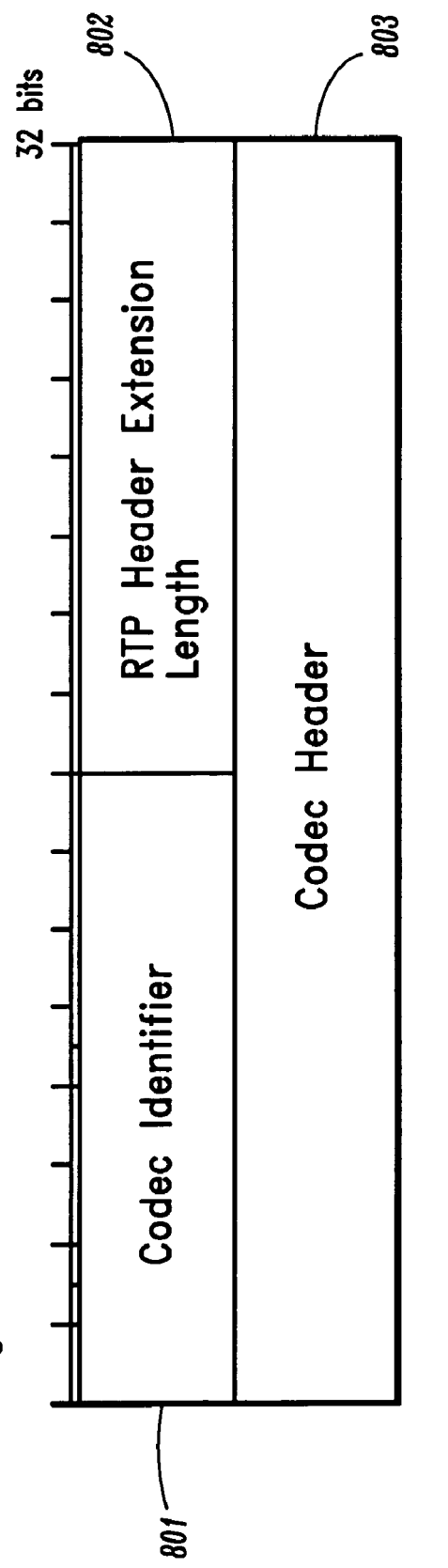
FIG. 8 is a diagram illustrating a method for extending the header of RTP to produce RTCCP (Real Time Conversational Coding Protocol) according to one aspect of the present invention.

FIG. 8 is a diagram illustrating the extension of RTP to produce RTCCP according to one aspect of the present invention. In the embodiment of FIG. 8, the additional information for the RECOVC payload is carried in the payload section of the RTP packet. As indicated above, an RTP packet comprises the fixed RTP header, a possible empty list of contribution sources, and the payload data. In accordance with one aspect of the present invention, a profile-specific extension to the RTP header comprises a 16 bit Codec Identifier field 801, an RTP Header Extension Length field 802, followed by a Codec Header field 803. In the preferred embodiment using RECOVC, the codec identifier 801 comprises a value for .xxx in RECOVC.xxx that indicates parameters of the different RECOVC codecs, wherein the RECOVC.xxx codec nomenclature is as follows: RECOVC.{sampling rate code}{Cepstra Vector Dimension Code}{Profile Code} Preferably, a default RECOVC codec, RECOVC.101, comprises the following default settings: {11 kHz sampling frequency code}=1, {13 dimensional cepstra code}=0 and {+pitch compressed at 4.5 kbit/s}=1 (before packetization), as indicated in the respective tables of FIGS. 5 and 6.

The RTP header extension length field 802 is a 16 bit field that counts the number of 32-bit words in the extension, excluding the 4-bytes comprising fields 801 and 802 of the RTP header extension. Moreover, in a preferred embodiment, the codec header field 803 comprises the RECOVC header (FIGS. 3 and 4) and payload data (i.e., the RECOVC header is included as RTP header extension. Furthermore, in an RTP packet comprising a RECOVC extension, the X bit is set to one, indicating that a variable length header extension is appended to the RTP header. The resulting stream of extended RTP packets constitutes a preferred RTCCP stream (Real-Time Conversational Coding protocol) according to the present invention.

Figure 9:
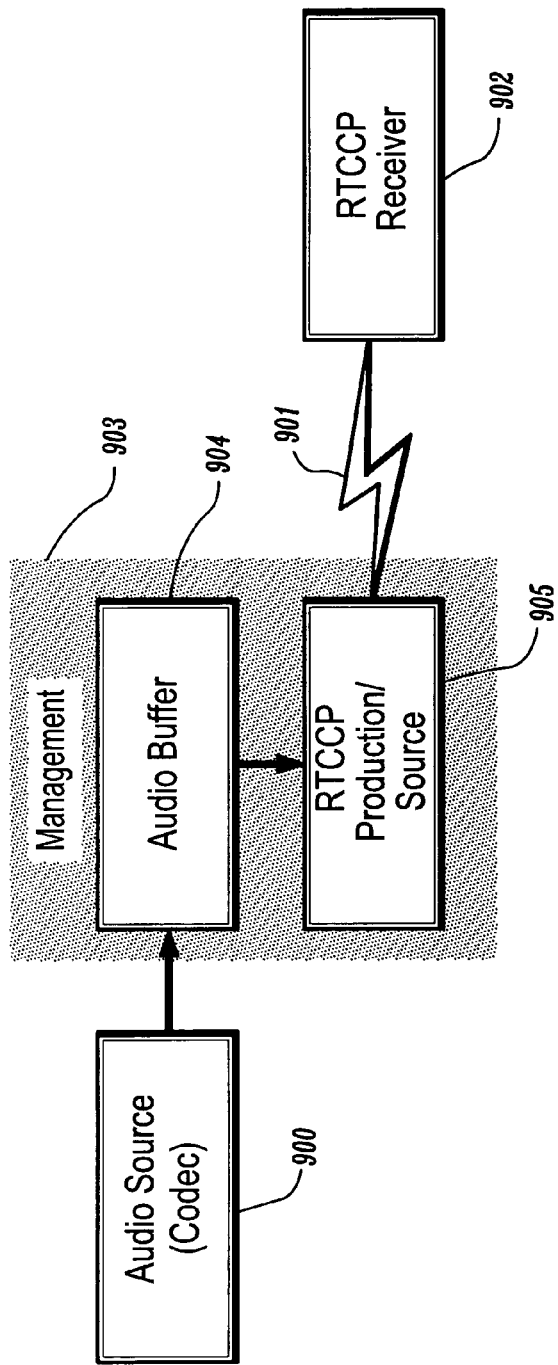
FIG. 9 is a diagram of a system/method for generating an RTCCP data stream according to an embodiment of the present invention.
Figure 10:
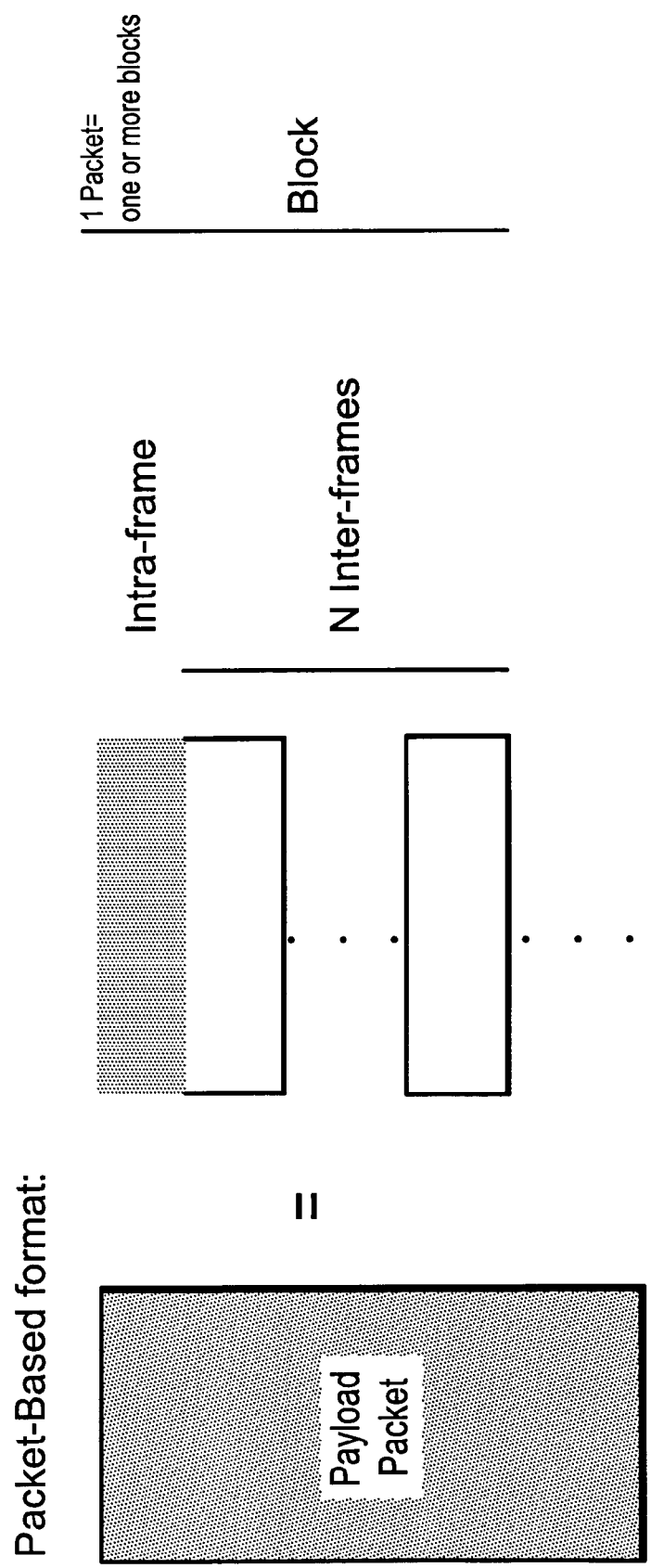
FIG. 10 is a diagram of a method for generating an RTCCP data stream according to one aspect of the present invention.

Referring now to FIG. 9, a block diagram illustrates a system/method for streaming/packetizing RTCCP data. An audio source (codec) 900 generates audio/speech data to be transmitted over a network 901 to a receiver 902. The transmitter comprises a system manager 903 which manages a an audio buffer and RTCCP generator 905. The audio source 900 preferably comprises the RECOVC encoder 200 (FIG. 2a) and the receiver preferably comprises the RECOVC decoder 211 of FIG. 2b. The packetization of the RECOVC file format received from the audio source 900 is preferably achieved by buffering (via the audio buffer 904) the data stream block by block (and initially sending the header). More specifically, as illustrated in FIG. 10, each RTCCP packet output from the RTCCP generator 905 comprises one or more Blocks (FIG. 3). If silence Segments are dropped (not transmitted, corresponding time stamps can be transmitted to indicate the delay that can be introduce therebetween. If desired, silence information can be communicated by sending the information according to the RECOVC file format (FIG. 3). For real-time dialogs, with human or machines, the buffer size is preferably 300 ms maximum. Typically with 300 ms packets, the data rate can be as low as 4 kbit/s (4.5 kbit/s when reconstruction of the waveform is not required). This is sufficient for real-time low bit rate transmission even over wireless modem and real-time interaction. For deferred interaction, however, it is to be understood that the packet size can be a large as desired.

If desired, error correction can be performed on a block by block basis. Preferably, a data Segment, defined by the RECOVC file formation, can be included which contains the error recovery information. More specifically, as shown in FIG. 6, error correction presence and type may be defined by the first bytes of an Ancillary Data field (Data Segment Header) by including (1) the size of the ECC information (where value of "0" indicates no ECC) and (2) and ECC identifier.

Figure 11:
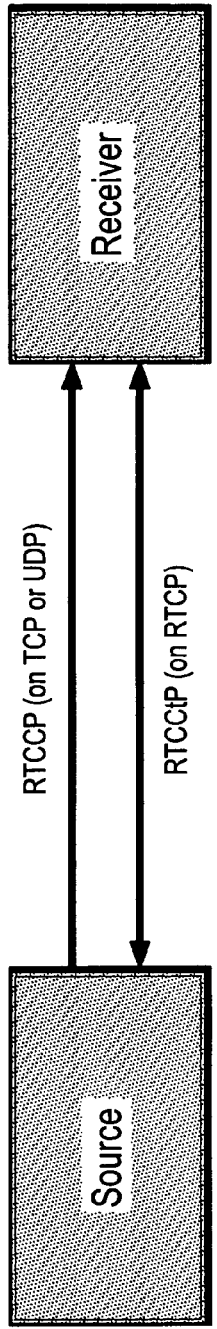
FIG. 11 is a diagram illustrating conversational protocols according to one aspect of the present invention that are implemented for network communication between a source and a receiver.

It is to be appreciated that, as discussed in detail above, the RTCCP can run on top of an unreliable protocol such as UDP for real-time applications. When real-time is not an issue, RTCCP can be implemented on top of a reliable transport layer that will guarantee appropriate packet ordering and delivery such as TCP (transmission control protocol). This is illustrated in FIG. 11.

As indicated above, because multiple conversational codecs can be utilized (e.g. RECOVC with different settings), a protocol/mechanism should be defined to select a coding scheme. For instance, the endpoints, e.g., source and receiver, must negotiate to determine compatible settings before the audio data and/or data communication links can be established. The present invention preferably utilizes the control functions defined by the H.245 standard (which is known to those skilled in the art), which specifies messages for opening and closing channels for media streams, and other commands, requests and indications to provide such control functions. More specifically, an initial connection between a source and receiver starts with a preliminary handshake, similar to H.245, except that it incorporates all the different conversational codecs (e.g., RECOVC) that are employed in the given application. The extension of the H.245 control and handshake protocol is referred to herein as H.245.RTCCP.

More specifically, the default for transmission is set to RECOVC.101 (rather than G.711 (audio codec, 3.1 Khz at 48, 56, and 64 Kbps (normal telephony) or G.723 (Audio codec, for 5.3 and 6.3 Kbps modes) as currently prescribed by H.245) which is supported by all end points in the network. Aurora DSR or other schemes may also be supported. In real-time mode, RECOVC.101 is a preferred default codec that is initially enabled/selected upon system connect unless an agreement is reached to select another coding scheme before completion of the handshake, in which case the agreed upon coding scheme will be implemented.

As further indicated above, a control protocol/mechanism should be defined for switch a coding scheme in the middle of a RTCCP stream transmission. In accordance with a preferred embodiment, notification and confirmation messages are transmitted as control extensions to the RTCP (Real Time Control protocol), resulting in what is referred to herein as RTCCtP (Real time Conversational Control Protocol). This architecture is illustrated in FIG. 11.

As is known in the art, RTCP is based on a periodic transmission of control packets to all participants in a session, using the same distribution mechanism as the RTP packets. The underlying transport protocol must provide multiplexing of the data and control packets, for example, using separate port numbers with UDP. As is further known in the art, the RTCP specification defines several RTCP packet types to carry a variety of control information, where each RTCP packet type is allocated a unique identification code. For instance, the RTCP packet types include sender reports (SR) (code 200) for transmission and reception statistics from participants that are active senders, as well as receiver reports (RR) (code 201) for reception statistics from participants that are not active senders. RTP receivers provide reception quality feedback using RTCP report packets which may be SR or RR reports, depending on whether or not the receiver is also a sender. The only difference between the sender report (SR) and the receiver report (RR) forms, besides the packet type code, is that the SR includes a 20-byte sender information section for use by active senders. The SR is issued if a site has sent any data packets during the interval since issuing the last report or the previous one, otherwise the RR is issued. Other packet types include source description (SDES) (code 202) packets comprising source description items such as CNAME (canocial endpoint identifier), BYE packets (code 203) to indicate end of participation, and APP packets (code 204) for application specific functions.

As is known in the art, each RTCP packet begins with a fixed header similar to that of RTP data packets, followed by structure elements that may be of variable length according to the packet type, but which always end on a 32-bit boundary (so as to allow RTCP packets to be "stackable" or concatenated to form a compound RTCP packet that is sent in a single packet of the lower layer protocol, e.g., UDP).

In accordance with a preferred embodiment of the present invention, in addition to the conventional RTCP functions, RTCP is extended to RTCCtP to include application specific functions for conversational distributed functions. More specifically, in addition to the conventional RTCP functions, RTCP sender and receiver reports, for example, can be extended with suitable profile-specific extensions to support coding scheme notifications (signal/agree on changes of coding schemes). Other application specific extensions for conversational distributed functions include, e.g., RTCCtP identifiers, header extension length, code bits for RTCCtP functions, packet receipt request and acknowledgments, and codec change notification/request for confirmation, etc. These messages are propagated through the RTCP layer associated with the RTP stream.

By way of example, for purposes of error correction, RTCCtP messages can require packet repetition and provide the packet sequence number of the packets to be repeated. In one embodiment, the RECOVC header of the RTCCP packet is repeated based on the receivers report (RR) in the RTCCtP stream. In a default case, the RECOVC header is repeated until confirmation is obtained from the receiver. The receiver must confirm to the sender the receipt of an X=1 packet and provide the packet ID/sequence number.

It is to be understood that in the absence of RTP/RTCP, to provide control, the source may transmit the RECOVC header until confirmation is received by the source for all registered receivers. Moreover, in the absence of RTP support by the transport layer, similar functions must be emulated between clients and servers. Furthermore, in the absence of RTCP support by the transport layer, similar functions must be emulated between the clients and servers.

Figure 13:
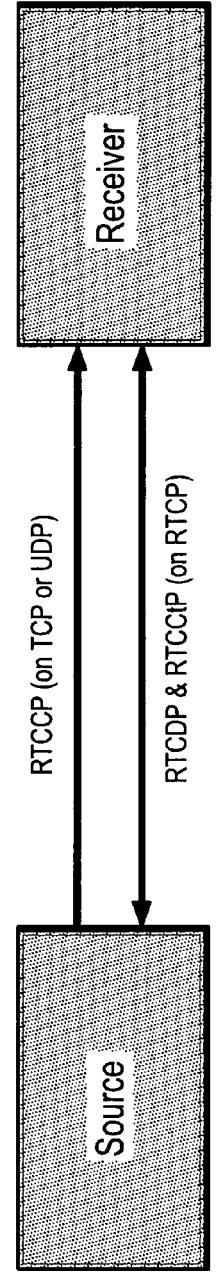
FIG. 13 is a diagram illustrating conversational protocols according to another aspect of the present invention that are implemented for network communication between a source and a receiver.

It is to be appreciated that in accordance with another aspect of the present invention, RTCCtP may be further extended to transmit other application-specific control data between, e.g., a client (source) and a speech server (receiver) for providing conversational distributed functions. In a preferred embodiment, when additional RTCP packets are needed for immediate information transfer, the APP RTCP packet type (code 204) noted above is preferably utilized to provide an application-specific extension for implementing the conversational distributed functions. A preferred complete control protocol is referred to herein as RTCDP (Real-Time Conversational Distributed Protocols). This is illustrated in FIG. 13, where, preferably, RTCCP is implemented on top of UDP (real-time) or TCP (non real-time) and a reliable layer carries RTCP, RTCCtP and RTCDP. It should be noted that control data may also be conveyed via other conventional connections such as sockets, RPC, RMI and HTTP.

Figure 12:
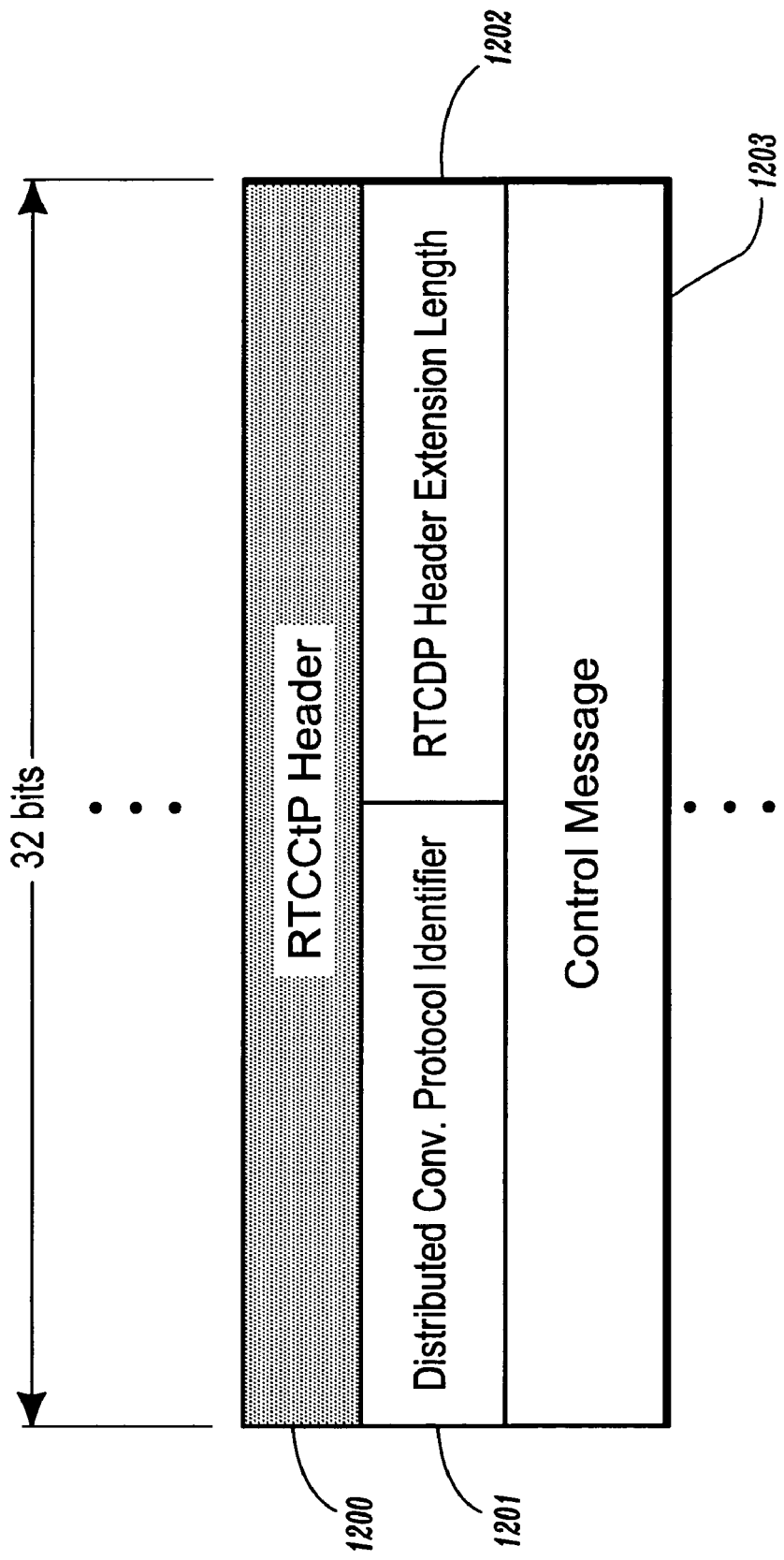
FIG. 12 is a diagram illustrating a method for implementing RTCDP (real time conversational distributed protocol) on top of RTCP according to one aspect of the present invention.

Referring to FIG. 12, a diagram illustrates an extension of RTCP/RTCCtP to implement the preferred RTCDP. FIG. 12 illustrates a preferred method for implementing RTCDP by adding (to the RTCCtP header) another header to carry the control data. An RTCCtP header 1200 (which comprises and extension of the RTCP header) is preferably extended by adding a 16 bit identifier field 1201 indicating the type of conversational distributed protocol (e.g., remote control of an engine, or a synchronization or negotiation protocol, etc.), when such nomenclature is implemented (if none exists, the field 1201 may be used for padding). Further, a 16-bit header extension length field 1202 describes the length of the header. A data field 1203 carries a message of the streamed protocol in successive 32 bit fields.

It is to be appreciated that depending on the application, any suitable application-specific control data can be transmitted between, e.g., a source and a receiver using RTCCtP for providing conversational distributed functions. For example, the protocols and APIs described above in connection with the above-incorporated International Appl. Nos. PCT/US99/22927, filed on Oct. 1, 1999, entitled: "Conversational Computing Via Conversational Virtual Machine," and International Application No. PCT/US99/22925, filed on Oct. 1, 1999, entitled "*System and Method For Providing Network Coordinated Conversational Services,*" may be implemented to transmit control parameters and messages to support remote control of a speech engine (e.g., start/stop recognition), determine type of recognition to perform (e.g., speech, TTS, speaker recognition, NL parsing, NL tagging, Dialog Management, etc.), what data files to use (e.g., grammar files, acoustic models, language models, tagger data files, parser data file, dialog information, etc.), where and how results of, e.g., a recognition, should be sent, as well as messages that are needed to register, negotiate, and synchronize different engines.

Furthermore, with Voice Browsers and Multi-Modal Browsers (as described below) and other applications, the control messages of RTCCtP may be transmitted as XML data (e.g., URLs pointing to particular algorithms, data files, and engines to be implemented) or byte code representation of XML tags (preferably, XML name space convention according to CML) and values associated with necessary control information. Such control information comprises: field identifiers and/or browser event identifiers (when also sent to Multi-modal shell (described below); argument data file(s) for the engines; format of the result/output to be specified (e.g., audio format (e.g., RTP stream) or text (ASCII, XML, attribute value pairs) or function call), with extra tag information and address of browser to push data; address and method/protocol to send results (back to browser or content server); identifier for the results, and commands to execute. Furthermore, when the stream is sent to a speech server, the XML tags associated with the active input are sent: field information for a directed dialog, active forms (or URLs of forms) for mixed initiative NL, etc. It is to be noted that the packets of streamed XML and protocols may be implemented using SOAP (simple object access protocol). In summary, RTCCtP may be used to transmit all types of control messages depending on the implementation.

Figure 14A:
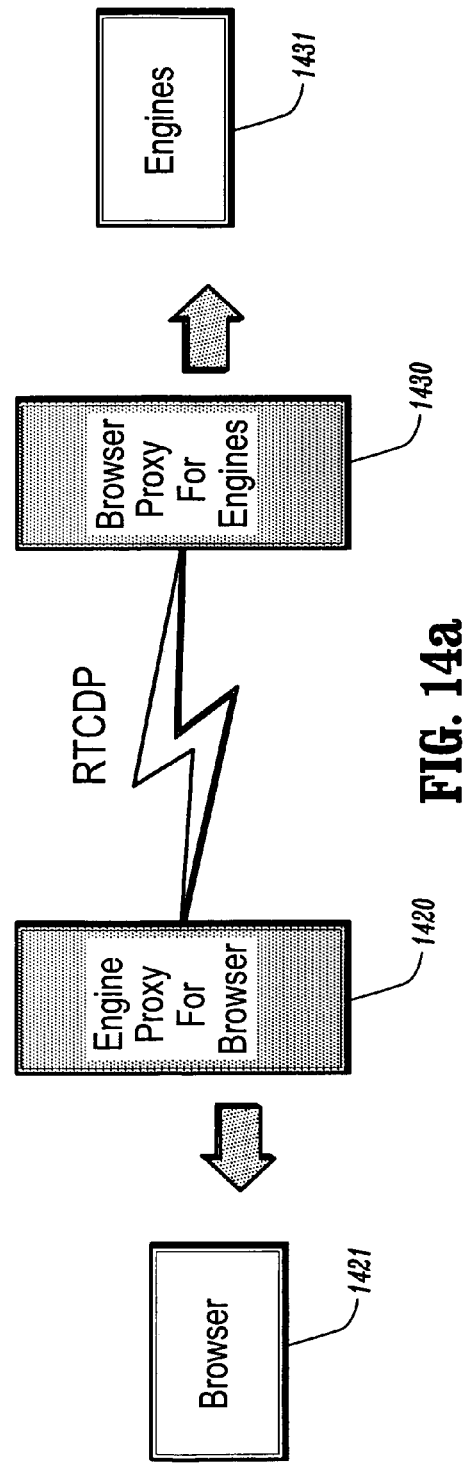
FIG. 14a is a diagram illustrating a system/method for implementing a distributed conversational framework using proxy servers according to one aspect of the present invention.

Referring now to FIG. 14a, a diagram illustrates a system/method for implementing a distributed conversational framework using proxy servers according to one aspect of the present invention. The exemplary system of FIG. 14a comprises an engine proxy 1420, which operates on behalf of a browser application 1421, and a browser proxy 1430, which operates on behalf of conversational engines 1431. More specifically, for this application, RTCDP is preferably utilized by the proxies 1420, 1430 for exchanging control data to enable the engine proxy 1420 to effectively operate as a local speech engine for the browser, and to enable the browser proxy 1430 to effectively operate as a local browser for the engines 1431. The engines 1431 will directly communicate with the browser proxy 1430 using suitable speech engine APIs and the browser 1421 will communicate with the engine proxy 1420 using the same engine APIs.

Advantageously, this framework allows the engines 1431 and browser application 1421 to disregard the fact that the other component is local, remote, or distributed. Between the proxies, the RTCDP protocols assure real-time exchange of the control parameters. Again, the RTCDP control stream exchanged between the proxies 1420, 1430 may comprise information such as argument data file(s) for the server engines, additional feature transformations, addresses where to send the results (back to browser or to content server), format of result (text, XML or Audio RTP stream), extra tag information and address of browser or server where to push data, identifier for the results, commands to execute, data file: what data file to use and whereto get it from; description of the type of processing to apply, e.g. algorithm string—sequence of actions to perform on the input; expected type and format of the results; address where to return the results; exception handling mechanisms; I/O event notifications (e.g. for a distributed multi-modal browser like DOM (document object model) level 2 events); modality specific view updates (e.g. ML pushes to the modality specific viewing browsers in the multi-modal browser case), etc.

Figure 14B:
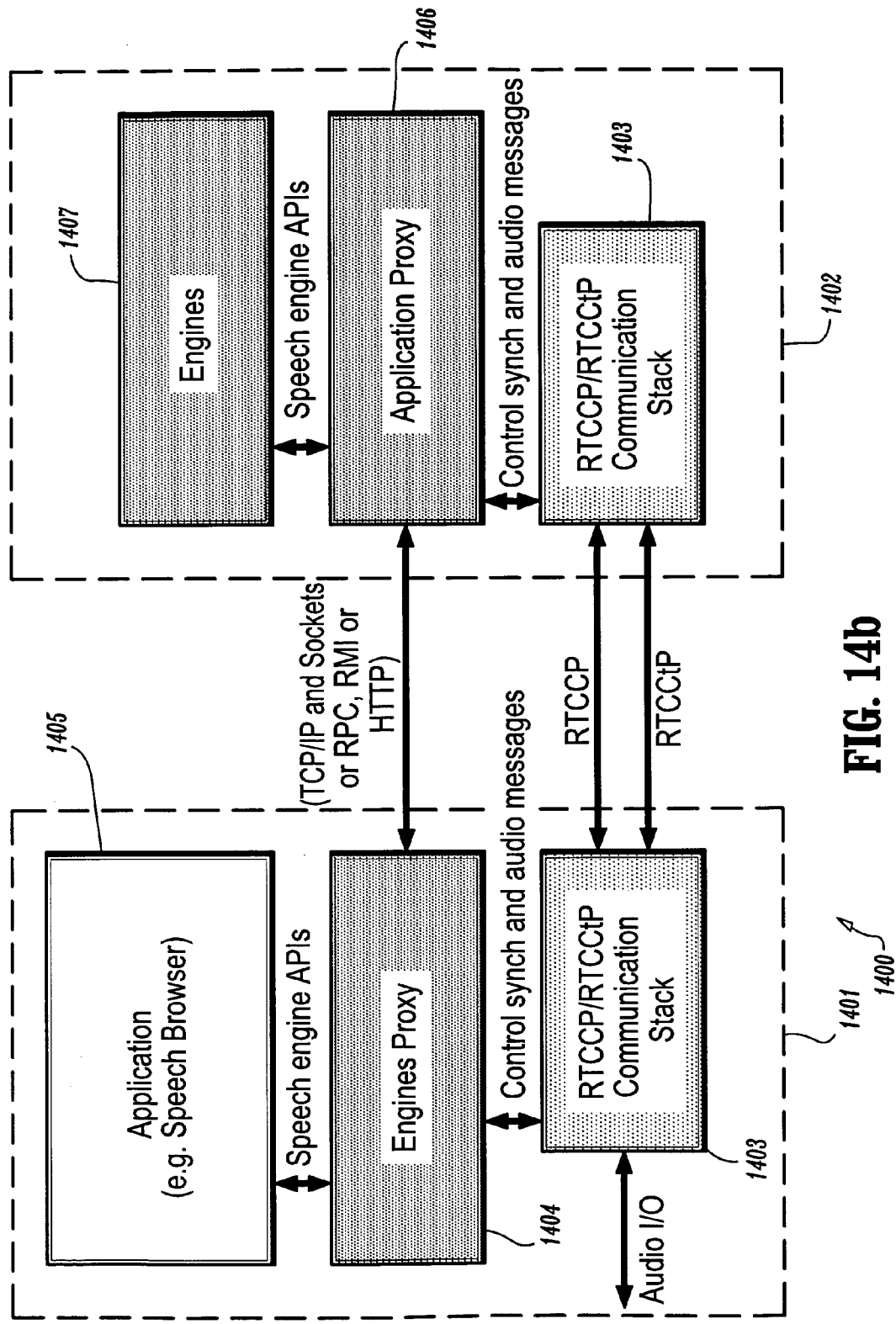
FIG. 14b is a diagram illustrating a system/method for implementing a distributed conversational framework using proxy servers according to another aspect of the present invention.

FIG. 14b a diagram illustrates a system/method for implementing a distributed conversational framework using proxy servers according to another aspect of the present invention. The exemplary system 1400 comprises a client 1401 and a server 1402, each comprising an RTCCP/RTCCtP communication stack 1403 according to the teachings herein for real-time exchange and control of audio data. The client 1401 comprises an engine proxy 1404 and a conversational application 1405 such as a speech browser. The server 1402 comprises an application proxy 1406 and conversational engines 1407.

For this application, the proxies operate as described above with reference to FIG. 14a, but instead of implementing RTCDP to exchange control data, the proxies utilize conventional protocols such as TCP/IP and sockets or RMI, RPC or HTTP, for example, for control and exchange of the conversational application API/messages/control, wherein the RTCCP and RTCCtP protocols are used for real-time exchange of the audio via the communication stacks 1403.

Indeed, in alternate embodiments of the invention, RTCDP control of, e.g., remote conversational engines can be implemented via remote APIs (e.g., RMI (preferably JSAPI (java speech API with extensions) or RPC) to the engines which precedes argument audio streams, although higher level control is still preferably performed via RTC-CtP. The remote calls preferably use TCP (over IP) or any other transport mechanism that reliably guarantees message delivery.

Figure 15:
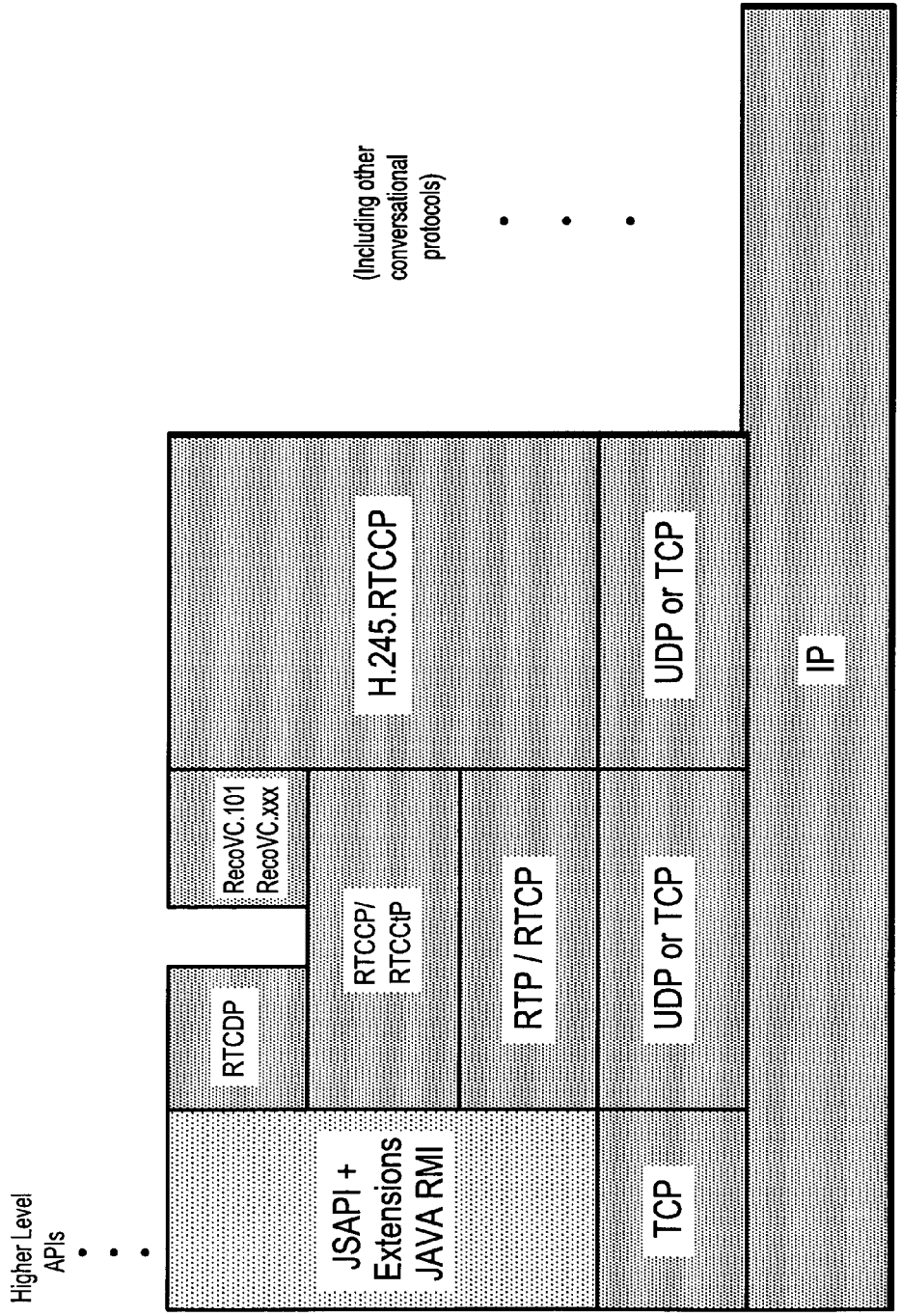
FIG. 15 is a diagram illustrating a conversational protocol stack according to one aspect of the present invention.

The overall conversational protocol architecture (or umbrella stack) according to a preferred embodiment of the present invention is illustrated by the diagram of FIG. 15. As illustrated, an extension of H.245 control protocol, i.e., H.245.RTCCP, is implemented on top of UDP/IP or TCP/IP. In addition, the control protocol RTCDP, which is an extension of RTCCtP/RTCP, is implemented on top of UDP/IP or TCP/IP. Likewise, a preferred streaming protocol, RTCCP, which is generated by wrapping a preferred CODEC file format, RECOVC.xxx, in RTP, is implemented on top of UDP/IP or TCP/IP. Moreover, remote APIs such as JSAPI are preferably implemented on top of TCP/IP. It is to be understood that over IP, an explicit switch from UDP transport to TCP transport is preferably supported by the conversational protocol stack.

Advantageously, the use of RTP-based conversational protocols as described herein guarantees that the conversational protocols are compatible with, and can be extended to, any network (existing or future) that supports streamed data and Voice over IP or packet voice communications. For example, well-known protocols such as H.323 and SIP (session initiation protocol), which rely on RTP/RTCP can be readily extended to implement the conversational protocols described herein. Moreover, other types of wireless networks can use similar designs adapted to the peculiarity of the underlying communication protocol layers.

Further, as indicated above, it is to be understood that the above-described functions could be directly supported on top of TCP, HTTP or other transport protocols, depending on the important of real-time versus guaranteed packet delivery, using the same conversational protocols and header extensions.

Figure 16:
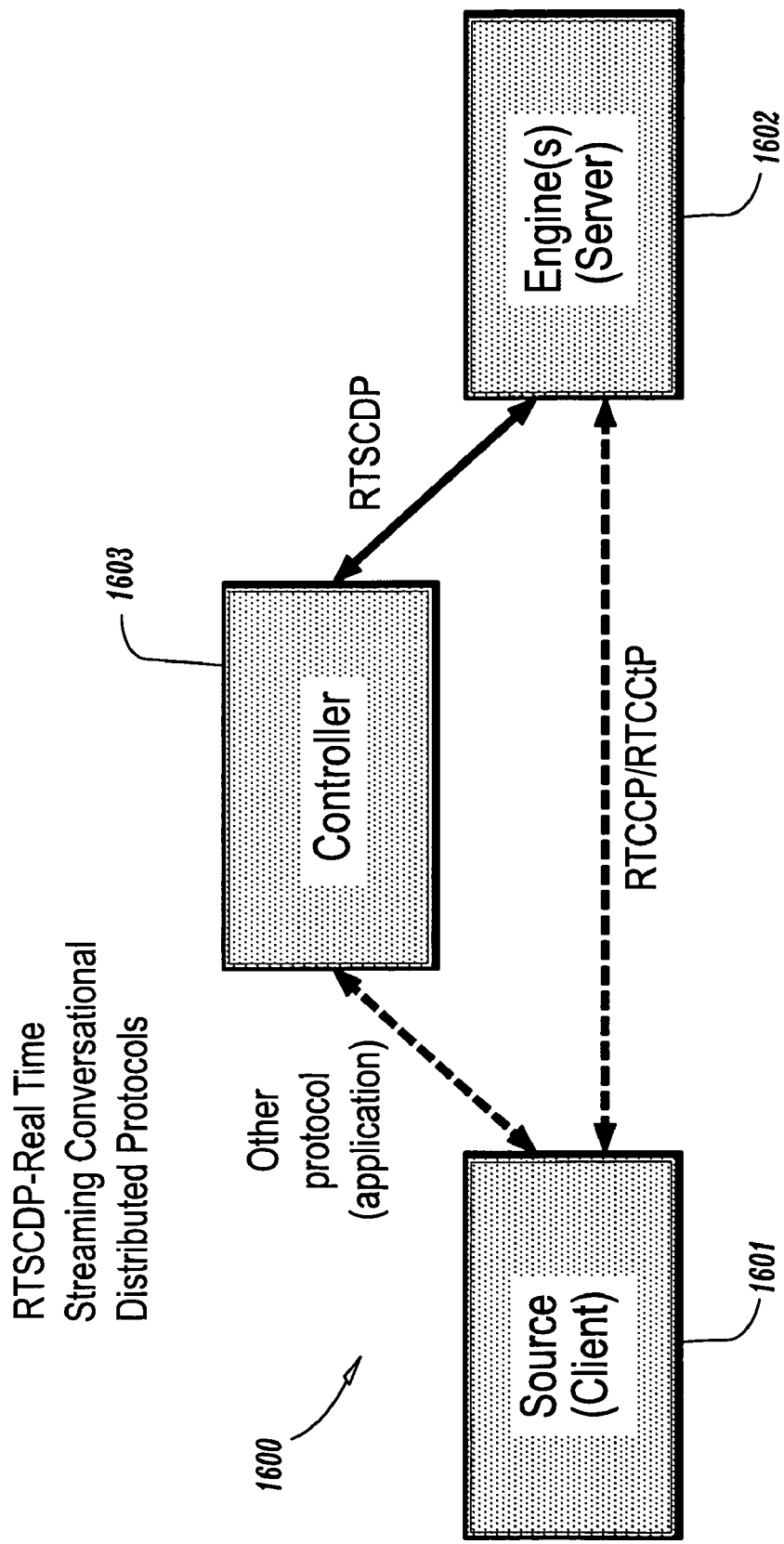
FIG. 16 is a diagram illustrating a system/method for implementing a real-time distributed protocol using RTSP (real time streaming protocol) according to another aspect of the present invention.

Referring now to FIG. 16, a diagram illustrates a system/method for implementing RTSP (real time streaming protocol) with conversational protocols according to an embodiment of the present invention. In this embodiment, RTCDP messages are preferably wrapped in RTSP (real time streaming protocol) instead of RTCP, to produce what is referred to herein as RTSCDP (real time streaming conversational distributed protocol). This streaming mechanism is preferred when control of conversational engines is performed by another entity other than the source(s) of the audio RTCCP stream.

More specifically, in FIG. 16, a system 1600 comprises a source 1601 (e.g., a client hand held device which provides speech I/O to a user), a controller 1603 (e.g., an application such as a speech browser) and a server 1602 comprising one or more conversational engines that process the speech I/O, all of which are remotely connected over a network. The source 1601 and server 1602 communicate via RTCCP/RTCCtP. The source 1601 and controller 1603 communicate via any suitable application protocol. The controller 1603 and server 1602 communicate via RTSCDP.

Preferably, the RTSCDP protocol is used when control of the conversational engines 1602 is performed by the controller 1603 and not the source 1601. In such a case, it is preferable to ship the audio from the source 1601 directly to the server 1602 engines, instead of shipping audio from the source 1601 to the controller 1603 (browser), and then having the controller 1603 ship the audio and control data to the server engines 1602.

If the audio is not shipped from the controller 1603, it does not utilize the RTCCtP layer. But in a Voice over IP environment, for example, the RTSP protocol has been explicitly developed to act as a remote control of an appliance/service (i.e., controller 1602) acting on a RTP stream with appropriate synchronization features with the RTP stream when needed. Therefore, given the current VoIP framework, it is advantageous to extend RTSP to add the conversational control messages (transmitted between the controller 1603 and server 1602) on top of RTSP to control the conversational engines that act on the RTCCP/RTCCtP stream received by the source 1601.

IV. Distributed Conversational Networking Examples

Figure 17:
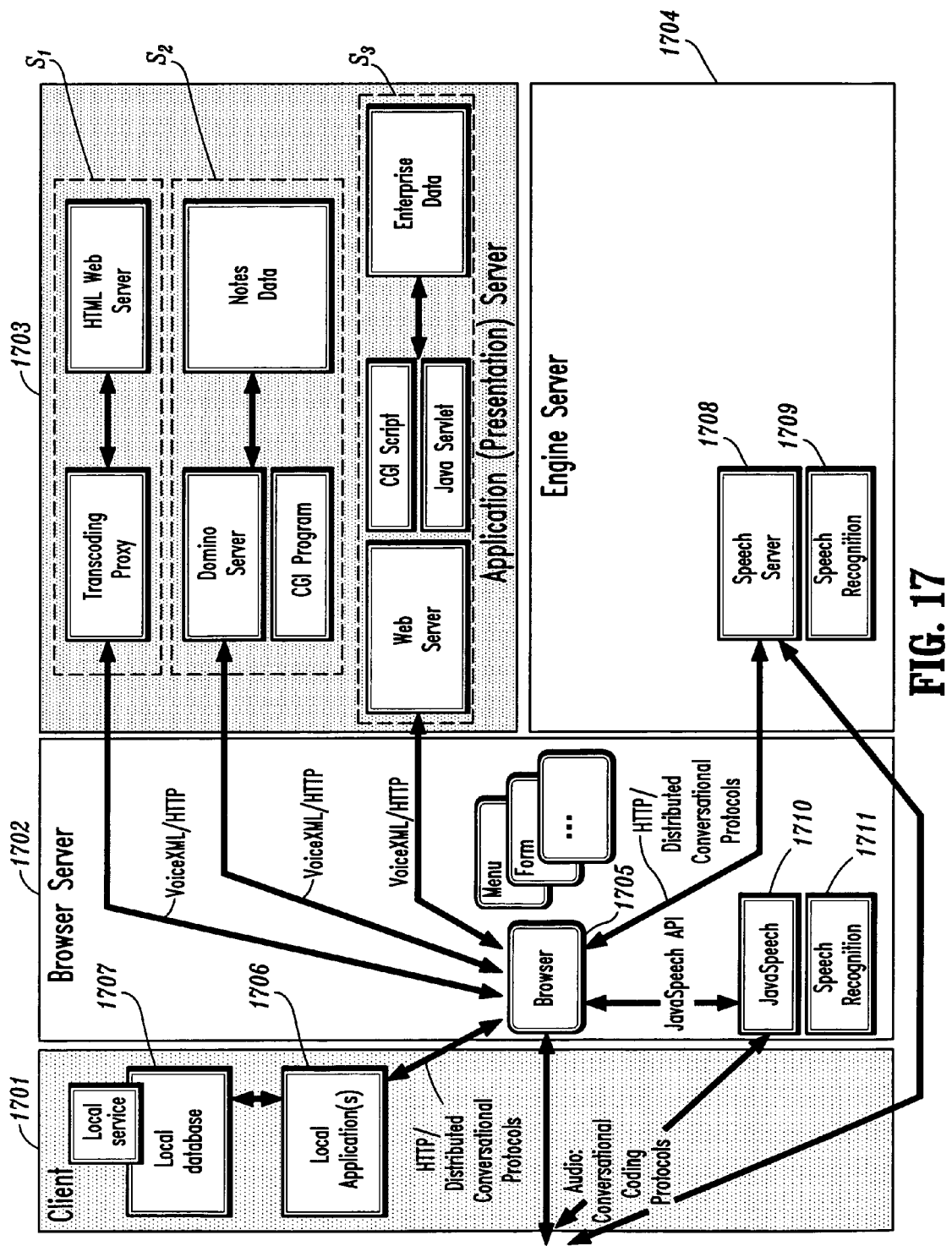
FIG. 17 is a diagram illustrating an exemplary distributed conversational network architecture that may be implemented using conversational protocols according to the present invention.

Referring now to FIG. 17, a diagram illustrates an exemplary distributed conversational network that may be implemented using the conversational protocols described herein. In particular, a system 1700 of FIG. 17 illustrates a distributed architecture comprising a conversational (speech) browser. A detailed discussion of the architecture and operation of the speech browser is disclosed, for example, in International Appl. No. PCT/US99/23008, filed on Oct. 1, 1999, entitled "Conversational Browser and Conversational Systems", which is commonly assigned, and fully incorporated herein by reference (which also claims priority from the above-incorporated U.S. patent application Ser. Nos. 60/102,957 and 60/117,595). The conversational (speech) browser operates to parse the declarative framework (including the imperative specification) of a VoiceXML page (or any other form of SpeechML (speech markup language)) and render the conversational UI of the target content or transaction to a user. VoiceXML is a speechML that has been recently designed and proposed as a standard for declaratively describing the conversational UI for, e.g., speech browsers and IVR platforms. Example implementations and details of VoiceXML can be found at the VoiceXML home page (www.voicexml.org). The VoiceXML standard is an embodiment of the speech markup language described in the above-incorporated application International Appl. No. PCT/US99/23008.

Conventional implementations of speech browsers assume local processing of speech. This is true for browsers that are local on pervasive clients or remote on servers (e.g. telephony servers). It is to be appreciated, however, that the speech recognition engine (and other conversational engines) can be remotely located from the client device, machine, or platform that captures the speech. Indeed, within the Voice XML 0.9 specifications, this can be artificially implemented through a grammar specification.

By way of example, as illustrated in FIG. 17, the distributed conversational system 1700 comprises a local client 1701, a browser server 1702, an application server 1703 and an engine server 1701, all of which are distributed over a network and communicate using the conversational protocols described herein. A speech browser 1705 is located on the browser server 1704 which is accessed by the client 1701. As explained below, the browser server 1702 can act as an intermediary between the client 1701 and the presentation server 1702 and/or engine server 1704. The browser 1705 receives pages of VoiceXML from the application (presentation) server 1703 and processes such pages to render the conversational UI of the pages or transactions.

The client device 1701 may be, for example, a desktop PC (personal computer), a PDA (personal digital assistant), an automobile computer, a smart phone or a conventional telephone. The client 1701 may also comprise one or more speech-enabled local applications 1706 (and a database 1707) running on the client 1701. The client utilizes using conversational protocols described herein to communicate with the speech browser 1705. For example, the local application may be a car navigation application in which a "Speech Navigation Application" interacts with computer mapping software and a GPS (Global Positioning System) device to provide conversational driving directions. In addition, the local application may be a local speech browser, wherein the functions between the local speech browser and speech browser 1705 are distributed. In addition, functions between a local speech engine and remote speech engine may be distributed.

The browser server 1702 can access any one of a plurality of server systems S1, S2, and S3 over network (e.g., the Internet) using a standard network protocol (e.g., HTTP, TCP/IP) to access VoiceXML pages on behalf of the client device 1701/local application 1706 and parse and process the page/transaction via the speech browser 1705. For example, the speech browser 1705 can connect to server S1 to access existing HTML information via a transcoding proxy that transcodes, e.g., legacy HTML documents to Q VoiceXML documents. In addition, the speech browser 1705 can connect to a specialized web server application (S2) such as Lotus Domino server to access Notes data (e.g., Notes e-mail) via a CGI application. In particular, the Domino server can be configured to generate VoiceXML pages and transmit pages using HTTP. In another example, the speech browser 1705 can connect to a web server application (S3), using a CGI application or Java Servlet to access an legacy database of an enterprise, wherein the web application generates and transmits the information in VoiceXML.

In the exemplary distributed system of FIG. 17, it is to be appreciated that the conversational protocols described herein may be implemented for communication between the client 1701 and the browser server 1702 and/or the client 1701 and the engine server 1704 and/or the browser server 1702 and the engine server 1004. For instance, the real-time conversational coding protocols described herein (e.g., RTCCP) may be used to ship captured audio from the client 1701 directly to the (1) speech browser 1705 of the browser server 1702 (which can the determine where to ship the speech for processing), (2) the speech server 1708 of the engine server 1704 for processing by the remote speech recognition engine 1709, and/or (3) the speech recognition engine 1711 (via, e.g., Java Speech API 1710). It is to be understood that the transmission of the speech may be performed via conventional analog transmission of telephony speech or analog or digital transmission of speech coded with a conventional CODEC (e.g. GSM, G.711, etc).

It is to be appreciated that the system of FIG. 17 enables a hybrid client/server architecture, wherein encoded speech data (e.g., RTCCP stream) is transmitted from the audio subsystem of the client 1701 to the speech browser 1702 and the speech browser 1705 determines whether to perform local or server-side processing. More specifically, based on the application logic loaded in the speech browser 1705, or based on meta-information within a VoiceXML page/application downloaded from the application server 1703 specifying where to ship the speech (received from the client 1701) for processing, the encoded speech data may be processed locally (via, e.g., the local speech recognition engine 1711 of the browser server 1702 or the remote speech recognition engine 1709 of the engine server 1704). In this manner, the application developer specifies this through the XML pages that declaratively describes the application. For example, assuming a VoiceXML page requires processing of the speech by the engine server 1704, the speech browser 1705 can communicate with the speech server 1708 using the conversational distributed protocols described herein (or via HTTP or sockets or RMI) to ship the audio to the speech server and send the appropriate data file instructions and engine calls.

Indeed, rather than redirecting the RTCCP sent from the client 1701, it is advantageous to send the RTCCP stream to the browser 1705 which redirects or multi-casts the RTCCP stream appropriately (this is different from the method described above with reference to FIG. 14, wherein the source transmits the RTCCP stream to the engine server instead of the controller (browser), and RTSCDP is used for communication between the browser and engines). As noted above, the shift between local speech processing (via the browser server 1702) and server-side speech processing (via the engine server 1704) can be determined by the VoiceXML page from the application server 400. Furthermore, this determination can be coded by the content provider or the adaptation to the device, e.g., the browser server 1702 may determine that its local resources are insufficient for processing the speech and then ships the speech for remote processing via a known or designated server.

Alternatively, the conversational protocols described herein (e.g., RTCCtP/RTCDP) provide a mechanism whereby the speech browser 1705 can communicate with the client 1701 to advise the client 1701 where to direct the RTCCP stream for remote processing. For instance, as shown in FIG. 17, the audio can be shipped from the client 1701 directly to the engines of the browser server 1702 or the engines of the engine server 1704.

Figure 18:
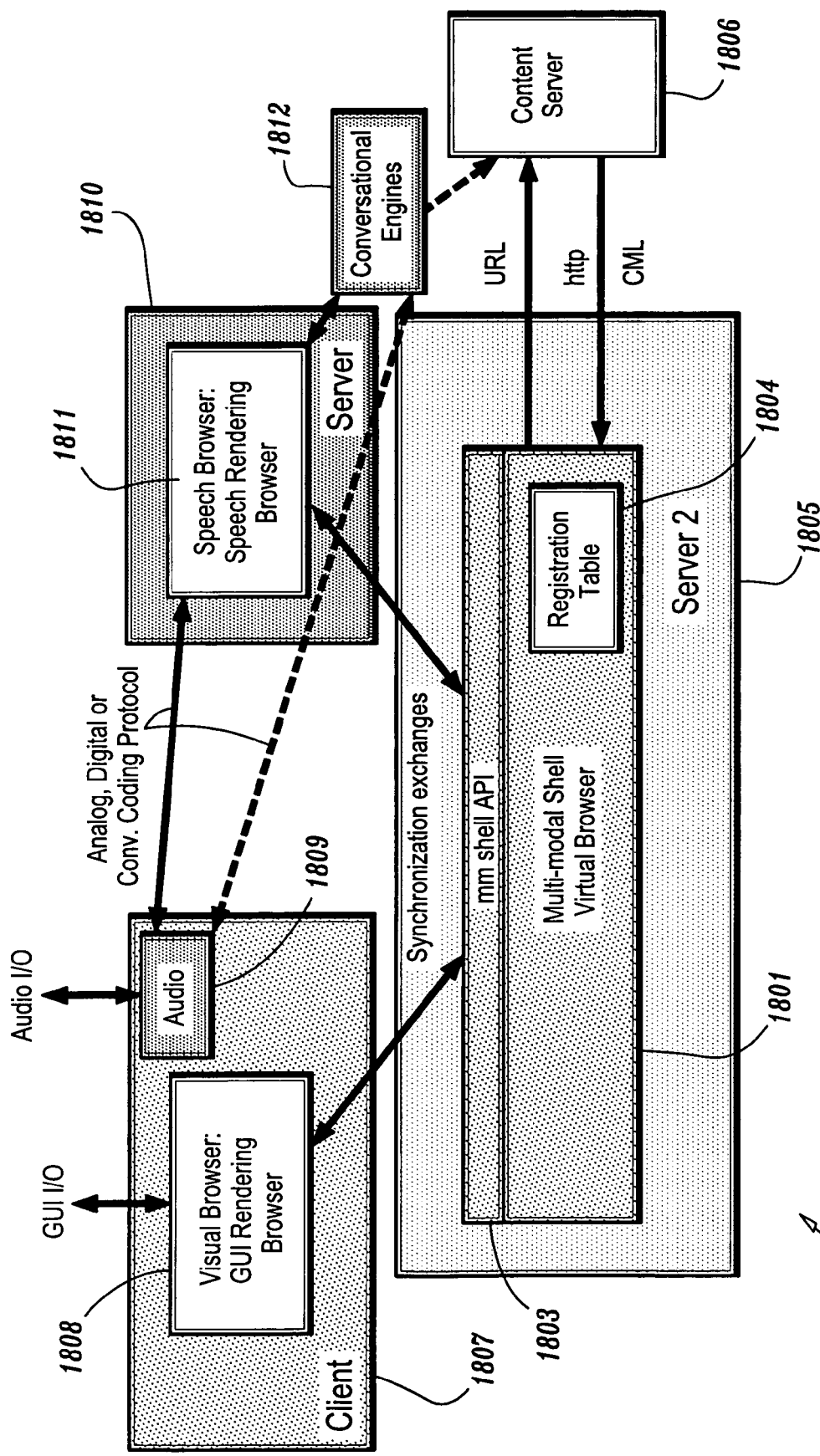
FIG. 18 is a diagram illustrating another exemplary distributed conversational networking architecture that may be implemented using conversational protocols according to the present invention.

FIG. 18 is a diagram that illustrates another exemplary distributed architecture that may be implemented using the conversational protocols described herein. In particular, the conversational system 1800 of FIG. 18 illustrates a distributed architecture comprising a conversational (multi-modal) browser and CML (conversational markup language). A detailed discussion of the architecture and operation of the multi-modal browser, as well as various CML formats, are disclosed, for example, in U.S. Ser. No. 09/507,526, filed on Feb. 18, 2000, entitled "Systems and Methods for Synchronizing Multi-Modal Interactions" and U.S. Ser. No. 09/544,823, filed on Apr. 6, 2000, entitled "Methods and Systems For Multi-Modal Browsing and Implementation of A Conversational Markup Language," both of which are commonly assigned and fully incorporated herein by reference.

In general, as described in the above-incorporated applications, a multi-modal browser comprises a multi-modal shell that parses and interprets CML (multi-modal) documents and mediates among, and coordinates synchronized information exchange between, multiple modality specific browser components (e.g., a visual browser and a speech browser). In one embodiment, content pages and applications are implemented in a gesture-based single authoring CML format, wherein conversational gestures are elementary dialog components that characterize the dialog interaction with the user and provide abstract representation of the dialog independently of the characteristics and UI offered by the device or application rendering the presentation material. The multi-modal browser processes a gesture-based CML document using specific predefined rules to automatically transcode the gesture-based CML document to any supported presentation modality or modalities of the particular browser or device (e.g., transcoded to the appropriate declarative language such as HTML, XHTML, or XML (for automated business-to-business exchanges), WML for wireless portals and VoiceXML for speech applications and IVR systems, etc.), as well as provide tight synchronization between the different views supported by the multi-modal browser.

In another embodiment, CML may be implemented by incorporating a plurality of visual and aural markup languages (i.e., a CML document that comprises sub-documents from different interaction modalities). For example, a CML document may be implemented by embedding markup elements from each of a plurality of represented/supported modalities (e.g., VoiceXML and HTML tags) in the same file using synchronizing tags to synchronize the different ML content (i.e., to synchronize an action of a given command in one modality with corresponding actions in the other supported modalities) on an element-by-element basis using, for example, the techniques described in the above-incorporated application International Appl. No. PCT/US99/23008, as well as U.S. Ser. No. 09/507,526.

In FIG. 18, the exemplary distributed system 1800 comprises server 1805 comprising a multi-modal browser (which comprises a multi-modal shell 1801, a registration table 1804 and multi-modal shell API 1803), a client device 1807 (which comprises a visual browser 1808 and an audio subsystem 1809), a server 1810 comprising a speech browser 1811, a plurality of remote conversational engines 1812 and a content server 1806 having content that is authored in CML. In the exemplary system 1800, the mono-mode browsers 1808, 1811 execute devices/servers that are remotely located from the server 1805 comprising the multi-modal browser. The multi-modal shell 1801 functions as a virtual main browser which processes CML documents retrieved over the network from content server 1806. The multi-modal shell 1801 coordinates information exchange via API 1803 calls that allow each mono-mode browser application 1808, 1811 to register its active commands and corresponding actions (both inter and intra mode processes as well as actions on other processes). Such registration may include any relevant arguments to perform the appropriate task(s) associated with such commands. The registration table 43 of the multi-modal shell 42 is a registry that is implemented as an "n-way" command/event-to-action registration table, wherein each registered command or event in the table indicates a particular action that results in each of the "n" modalities that are synchronized and shared for the active application. The multi-modal shell 1801 parses a retrieved CML document to build the synchronization via the registration table 1804 send the relevant modality specific information (e.g., markup language) comprising the CML document to each browser for rendering based on its interaction modality.

As shown in FIG. 18, the client 1808 (which comprises the GUI rendering browser 1808), the multi-modal browser 1801, the speech rendering browser 1811, the conversational engines 1812 and the content/application servers are distributed over a network. Using the conversational protocols described herein, speech data that is captured and encoded at the client 1807 via the audio subsystem 1809 can be shipped (via RTCCP) directly to the speech browser 1811 of server 1810 or the conversational engines 1812 for remote processing, or sent to the multi-modal shell 1801 which then redirects the stream. Moreover, the I/O events of the visual browser 1808 and speech browser 811 and synchronization exchanges can be shipped between the mono-modal browsers 1808, 1811 and the multi-modal shell 1801 using RTCDP, for example. Indeed, the non-streamed events (e.g., GUI events) and information to control the stream are preferably sent via the reliable layer (i.e. RTCDP). The control information (via RTCDP) describes how to process the I/O event (e.g., what data files to use, what processing to perform, whereto send the results, what format of the results, etc.). For instance, using the conversational control protocols described herein, the appropriate conversational engine can process the data according to the specified algorithm (e.g., speech recognition using grammar xxxx, followed by natural language understanding using engine yyy and data files zzzz) and ship the results (as specified by RTCDP) to the address (as specified by RTCDP). If the results are audio (e.g., synthesizes speech from a TTS (text-to-speech) engine, etc.), the results are shipped via RTCCP, for example. It is to be appreciated that all the control information may be encoded by the application developer (and completed via default settings by the browser and other components of the architecture such as the audio capture component).

It is to be appreciated that conversational protocols described herein (e.g., RTCCP, RTCCtP/RTCDP) may be used to implement low-bandwidth Voice over IP. For instance, using RECOVC described herein, the H.323 protocol stack (which is a standard is known in the art for a set of protocols providing voice, video and data conferencing over packet-based networks) can be readily extended to encompass RECOVC (i.e., H.323.RTCCP) and add conversational networking as a basic Voice over IP feature. Indeed, all other Voice over IP protocols such as H.323 that implement RTP can be extended using the conversational protocols described herein to allow direct two way voice communications between a regular device (e.g., telephone) and a device connected on a low bandwidth network, while also preserving capabilities to offer conversational functions.

Figure 19:
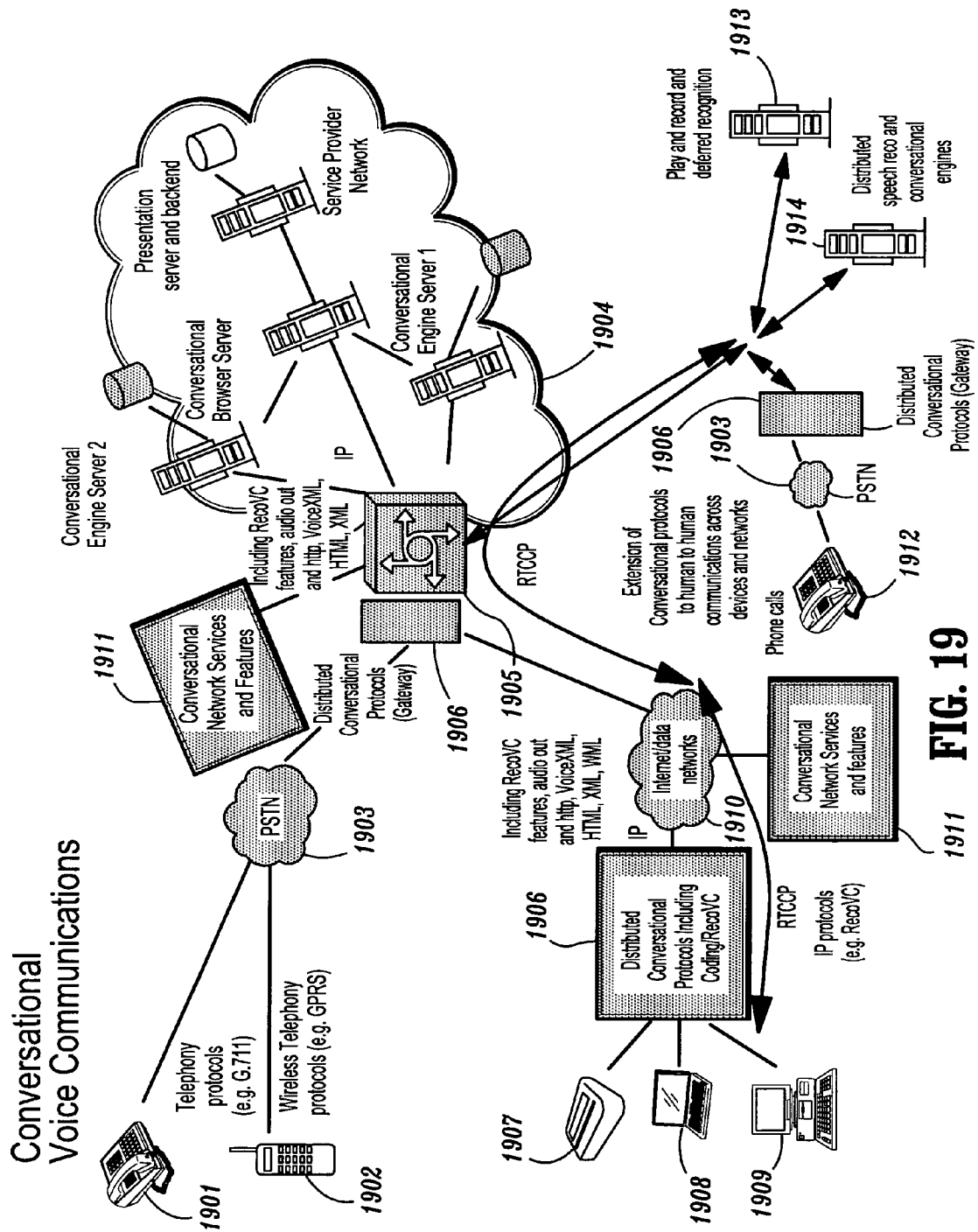
FIG. 19 is a diagram illustrating another exemplary distributed conversational networking architecture that may be implemented using conversational protocols according to the present invention.

By way of example, FIG. 19 illustrates a conversational distributed system 1904 which is accessible via a telephone (land line or wireless) or through a computer network 1910 (e.g., Internet), wherein the distributed conversational system 1904 comprises conversational browser servers, speech engine servers, and content and data files that are distributed over the network 1904. More specifically, as shown in FIG. 19, client devices such as a conventional telephone 1901 and wireless phone 1902 can access desired information from a distributed conversational system 1904 by connecting via a PSTN 1903 and router 1004. In addition, client devices such as a PDA 1907, laptop computer 1908 and personal computer 1909 can access the distributed conversational system 1904 via network 1910. The distributed system 1904 and network 1910 provide conversational network service extensions and features 1911 including distributed conversational protocols 1906 (discussed above), audio coding via RECOVC, applications and meta-information (distributed application protocol), discovery, registration, negotiation protocols, server load management to maintain dialog flow, traffic balancing and routing to maintain dialog flow, engine server selection based on task features and capability requirements and conversational argument availability (data files), conversational arguments (distribution: storage), traffic/routing and caching.

AS further illustrated in FIG. 19, RTCCP and RTCCtP/RTCDP can be used for a low bit rate two way human to human communication using the RECOVC codec. In particular, Voice over IP may employ the conversational protocols described herein to implement human to human communication between devices 1907, 1908, or 1909 and telephone 1912, where digital/analog speech data is transmitted over PSTN 1903 from the telephone 1903 converted to RTCCP and otherwise processed via servers 1913 and 1914.

It is to be understood that when conversational application are widely distributed across a network, mechanism should be employed to mitigate traffic and delay and some quality of service must be guaranteed and accordingly the network must be managed to provide this quality of service. This is implemented with conventional methods, however new consideration must be added to the cost functions to optimize. Indeed, the conversational distributed systems described herein require:

1. Data files (usually large) to be shipped to the appropriate conversational engines;
2. System management of the conversational engines to minimize processing delay;
3. Multiple transfer (e.g. between audio capture and browser and engine, between engine and browser, between browser and content server etc.)
4. Other synchronized data (multi-modal synchronization data, registration information, I/O events etc.).

This impacts the management (network and server systems) and renders even more acute the problem of intelligent network caching (not only of the content/business logic but also of the data files), storage, traffic routing, etc. Again all this is done using conventional method the novelty of the invention is that the optimization criteria has changed.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A communication system, comprising:
   a communication stack comprising:
      a first layer for generating encoded audio data, wherein the audio data comprises compressed feature vectors representative of speech, wherein the encoded audio data comprises a file format that enables transmission of segments of speech and decompression of the segments of speech in a random order;
      a second layer for generating a data stream comprising the encoded audio data;
      a third layer for generating a transmission control data stream, wherein the transmission control data stream comprises meta information for coding scheme notifications; and
      a fourth layer for transporting the data stream and the transmission control data stream.

2. The system of claim 1, wherein the first layer is adapted to reconstruct an audio waveform from encoded audio data.

3. The system of claim 1, wherein the first layer comprises one of a plurality of encoding schemes and the encoded audio data generated by the first layer comprises one of a plurality of corresponding encoding types.

4. The system of claim 3, wherein the coding schemes comprise (1) a speech recognition enabled coding scheme and (2) a speech reconstruction and speech recognition enabled coding scheme.

5. The system of claim 1, wherein the meta information for coding scheme notifications comprises meta information for one of selecting, changing, and selecting and changing, the encoding type of the encoded audio data.

6. The system of claim 1, wherein the communication stack further comprises a fifth layer for generating distributed control data, wherein the distributed control data is implemented for coordinating distributed conversational functions.

7. The system of claim 6, wherein the distributed control data comprises one of (1) a pointer to a data file (2) a data file, (2) an I/O (input/output) event notification, (3) a specification of a format of an output result, (4) an address specifying where to send an output result, (5) a field identifier for XML tags, (6) field identifiers for an active form, and a combination thereof.

8. The system of claim 1, wherein the file format of the encoded audio data comprises a file header comprising meta information that specifies a coding scheme, file size, and coding arguments associated with the encoded audio data.

9. The system of claim 8, wherein the coding arguments comprise one of sampling frequency, feature vector type, feature vector dimension, language type, frame duration, and a combination thereof.

10. The system of claim 1, wherein the file format comprises a speech segment header followed by a speech segment, wherein the speech segment comprises a plurality of blocks, wherein each block comprises a predefined number of frames of encoded speech data.

11. The system of claim 1, wherein the file format comprises at least one of a plurality of segment types and corresponding segment headers, wherein a given segment header comprises meta information that specifies a segment type and a length of the segment.

12. The system of claim 11, wherein the segment types comprise a speech segment, a silence segment, an end-of-stream segment, and ancillary data segments.

13. The system of claim 12, wherein error recovery information is specified by an ancillary data segment and corresponding data segment header.

14. The system of claim 1, wherein the second layer employs RTP (real time protocol) to wrap the encoded audio data.

15. The system of claim 1, wherein the third layer employs RTCP (real time control protocol) to wrap the transmission control data.

16. The system of claim 6, wherein the fifth layer employs RTCP (real time control protocol) to wrap the distributed control data.

17. The system of claim 6, wherein the fifth layer employs RTSP (real time streaming protocol) to wrap the distributed control data.

18. The system of claim 1, wherein the communication stack further comprises an API layer comprising one of JSAPI (java speech API), RPC (remote procedure call), RMI (remote method invocation) and a combination thereof.

19. The system of claim 1, wherein the communication stack is implemented in a Voice over IP network.

20. The system of claim 1, wherein the fourth layer comprises one of UDP (user datagram protocol), TCP (transmission control protocol), and both.

21. The system of claim 1, wherein the communication stack is tangibly embodied as program instructions on a program storage device.

22. A communication system for use in a real-time distributed conversational network, the communication system comprising:
a communication stack comprising:
a first layer for generating encoded audio data;
a second layer for wrapping encoded audio data in a real-time encoded audio data stream;
a third layer for wrapping control messages in a real-time control data stream
comprising control data that enables real-time control and coordination of
conversational distributed functions over the network; and
a fourth layer for generating a real-time transmission control data stream, wherein the real-time transmission control data stream comprises meta information for providing coding scheme notifications.

23. The system of claim 22, wherein the communication stack employs RTP (Real Time Protocol).

24. The system of claim 23, wherein meta information associated with the real-time encoded audio stream is added in a header of an RTP packet, wherein the RTP header extension comprises one field indicating an encoding type of the encoded audio data in the RTP packet and a second field comprising header information associated with a file of the encoded audio data.

25. The system of claim 23, wherein meta information associated with the real-time control data stream is added in a header of an RTCP (Real Time Control Protocol) packet, wherein the RTCP header comprises a first field indicating a type of conversational distributed protocol and a second field comprising a corresponding control message.

26. The system of claim 25, wherein the communication stack is implemented in a distributed multi-modal browser framework, and wherein the real-time control data streams comprises one of browser I/O events, a pointer to an argument data file, a pointer to a remote engine, and a combination thereof.

27. The system of claim 22, wherein the communication stack is implemented in a Voice Over IP network.

28. The system of claim 22, wherein RTSP (real-time streaming protocol) is employed to wrap the control messages.

29. The system of claim 22, wherein the communication stack is tangibly embodied as program instructions on a program storage device.

30. A method for providing real-time distributed conversational computing, comprising the steps of:
generating encoded audio data;
wrapping encoded audio data in a real-time encoded audio data stream; and
wrapping control messages in a real-time control data stream comprising control data that enables real-time control and coordination of conversational distributed functions over the network,
wherein the audio data comprises compressed feature vectors representative of speech and wherein the encoded audio data comprises a file format that enables transmission of segments of speech and decompression of the segments of speech in a random order.

* * * * *